US011569782B2

(12) United States Patent
Narla et al.

(10) Patent No.: US 11,569,782 B2
(45) Date of Patent: Jan. 31, 2023

(54) METHODS AND SYSTEMS FOR INTEGRATING ENERGY CONTROL SYSTEMS WITH ELECTRICAL SYSTEMS

(71) Applicant: SUNPOWER CORPORATION, San Jose, CA (US)

(72) Inventors: Sandeep Narla, Newark, CA (US); Brian Risi, Benicia, CA (US); Andrew Lutkus, Martinez, CA (US)

(73) Assignee: SUNPOWER CORPORATION, San Jose, CA (US)

( * ) Notice: Subject to any disclaimer, the term of this patent is extended or adjusted under 35 U.S.C. 154(b) by 0 days.

(21) Appl. No.: 17/381,581

(22) Filed: Jul. 21, 2021

(65) Prior Publication Data
US 2022/0029583 A1 Jan. 27, 2022

Related U.S. Application Data

(60) Provisional application No. 63/170,215, filed on Apr. 2, 2021, provisional application No. 63/054,517, filed on Jul. 21, 2020.

(51) Int. Cl.
| | |
|---|---|
| *H02S 40/34* | (2014.01) |
| *H02J 3/38* | (2006.01) |
| *H02J 3/00* | (2006.01) |
| *H02S 40/38* | (2014.01) |
| *H02S 40/36* | (2014.01) |
| *G06Q 50/06* | (2012.01) |

(52) U.S. Cl.
CPC ............. *H02S 40/34* (2014.12); *H02J 3/001* (2020.01); *H02J 3/381* (2013.01); *H02S 40/36* (2014.12); *H02S 40/38* (2014.12); *G06Q 50/06* (2013.01)

(58) Field of Classification Search
CPC .......... H02S 40/34; H02S 40/36; H02S 40/38; H02J 3/001; H02J 3/381; H02J 3/38; H02J 3/00; G06Q 50/06
See application file for complete search history.

(56) References Cited

U.S. PATENT DOCUMENTS

| | | |
|---|---|---|
| 2016/0028275 A1 | 1/2016 | Kamel et al. |
| 2016/0365708 A1 | 12/2016 | Stiefenhoffer et al. |
| 2020/0052492 A1 | 2/2020 | Rive et al. |

OTHER PUBLICATIONS

International Search Report and Written Opinion of the International Searching Authority in International Application No. PCT/US21/42637, dated Dec. 6, 2021 (19 pages).

*Primary Examiner* — Robert L Deberadinis
(74) *Attorney, Agent, or Firm* — Sterne, Kessler, Goldstein & Fox P.L.L.C.

(57) ABSTRACT

The present disclosure provides systems and methods for integrating an energy control system with an electrical system having a utility meter connected to a utility grid, a photovoltaic (PV) system, an energy storage system, and a plurality of electrical loads. The systems and methods include determining a site condition of the electrical system, determining a type of backup configuration for the electrical system based on the determined site condition, and determining a location of at least one of a main circuit breaker, the PV system, a subpanel, and a site current transformer with respect to the energy control system based on the determined site condition and the determined type of backup configuration.

15 Claims, 26 Drawing Sheets

METHODS AND SYSTEMS FOR INTEGRATING ENERGY CONTROL SYSTEMS WITH ELECTRICAL SYSTEMS

CROSS-REFERENCE TO RELATED APPLICATIONS AND INCORPORATION BY REFERENCE

This application claims priority to U.S. Provisional Patent Application No. 63/054,517 filed on Jul. 21, 2020 and U.S. Provisional Patent Application No. 63/170,215 filed Apr. 2, 2021, which are incorporated by reference herein in their entirety for all purposes.

FIELD

The present disclosure relates to methods and systems for integrating energy control systems with electrical systems. In particular, embodiments relate to methods and systems for integrating energy control systems with electrical systems to improve load management and control of photovoltaic (PV) power supply.

BACKGROUND

Residential electrical systems vary from home to home, where power in each home may be distributed from a utility feed to a plurality of electrical loads in myriad ways. For example, some residential homes feature a single panel for servicing all electrical loads of the residential system, whereas other systems use multiple service panels, including a main service panel and one or more subpanels directed to a subset of electrical loads. Moreover, the utility service sizes and load breaker sizes of residential electrical systems differ according to the size and the geographic location of the home. Residential electrical systems may also differ by having alternative energy sources, for example, photovoltaic power generation systems and/or energy storage systems that provide power to the loads or back to the grid.

Thus, due to these countless number of differences, integrating a stand-alone energy control system with various types of electrical systems can be challenging.

BRIEF SUMMARY

Accordingly, there is a need, for example, for procedures and systems that improve the process for integrating an energy control system with an electrical system that improves load management and efficiently combines photovoltaic power supply and energy storage.

In some embodiments, the present disclosure provides a method for integrating an energy control system with an electrical system having a utility meter electrically coupled to a utility grid, a photovoltaic (PV) system, and/or a plurality of electrical loads. In some embodiments, the method comprises a step of determining a site condition of the electrical system. In some embodiments, the method comprises a step of determining a type of backup configuration for the electrical system based on the determined site condition. In some embodiments, the method comprises a step of determining a location of at least one of a main circuit breaker, the PV system, a subpanel, and a site current transformer with respect to the energy control system based on the determined site condition and the determined type of backup configuration. In some embodiments, the method comprises a step of locating the energy control system downstream of the utility meter and upstream of at least one of the plurality of electrical loads. In some embodiments, the method comprises a step of electrically coupling at least one of the main circuit breaker, the PV system, the subpanel, and the site current transformer to the energy control system based on the determined locations. In some embodiments, the one or more site conditions include at least one of a type of service panel electrically coupled to utility meter, a size of utility service supplied by utility grid, a size of a largest load breaker associated with the plurality of loads, and a storage capacity of the energy storage system.

In some embodiments, the energy control system includes a grid interconnection, a backup load interconnection, a non-backup load interconnection, and/or a backup power interconnection.

In some embodiments, the type of backup configuration includes a whole backup configuration and/or a partial backup configuration. In some embodiments, under the whole backup configuration, all the plurality of loads are electrically coupled to the backup load interconnection. In some embodiments, under the partial backup configuration, the plurality of loads include a plurality of backup loads connected to the backup load interconnection and a plurality of non-backup loads connected to the non-backup load interconnection.

In some embodiments, the present disclosure provides a method for integrating an energy control system with an electrical system having a utility meter electrically coupled to a utility grid, a photovoltaic (PV) system, and/or a plurality of electrical loads. In some embodiments, the method comprises a step of determining a site condition of the electrical system. In some embodiments, the method comprises a step of determining a type of backup configuration for the electrical system based on the determined site condition. In some embodiments, the method comprises a step of determining a location of an electrical component with respect to the energy control system based on at least one of the determined site condition and the determined type of backup configuration. In some embodiments, the method comprises a step of electrically coupling the electrical component to the energy control system based on the determined location.

In some embodiments, the electrical component includes at least one of a main circuit breaker, the PV system, a subpanel, and a site current transformer. In some embodiments, the one or more site conditions include at least one of a type of service panel electrically coupled to utility meter, a size of utility service supplied by utility grid, a size of a largest load breaker associated with the plurality of loads, and a storage capacity of the energy storage system.

In some embodiments, the type of backup configuration includes a whole backup configuration and a partial backup configuration. In some embodiments, under the whole backup configuration, all of the plurality of loads are electrically coupled to a backup load interconnection of the energy control system. In some embodiments, under the partial backup configuration, the plurality of loads include a plurality of backup loads electrically coupled to the backup load interconnection of the energy control system and a plurality of non-backup loads connected to a non-backup load interconnection of the energy control system.

In some embodiments, determining the location of the electrical component includes determining whether to locate the electrical component inside a housing of energy control system or outside the housing of energy control system. In some embodiments, the electrical component includes at least one of a main circuit breaker and a site current transformer.

In some embodiments, determining the location of the electrical component includes determining whether to electrically couple the electrical component to a non-backup side of the energy control system or a backup side of the energy control system. In some embodiments, the electrical component includes at least one of the PV system and a subpanel.

In some embodiments, the plurality of electrical loads include a plurality of first backup loads and a plurality of second backup loads. In some embodiments, the site condition includes a service panel electrically coupled to a utility grid, the service panel having a first feed circuit and a second feed circuit. In some embodiments, the electrical component includes a first subpanel electrically coupled to the first feed circuit and the plurality of first backup loads. In some embodiments, the electrical component includes a second subpanel electrically coupled to the second feed circuit and the plurality of second backup loads.

In some embodiments, the energy control system includes a first energy control system and a second energy control system. In some embodiments, the step of determining the location of the electrical component with respect to the energy control system includes locating the first energy control system downstream of the service panel and upstream of the first subpanel. In some embodiments, the step of determining the location of the electrical component with respect to the energy control system includes locating the second energy control system downstream of the service panel and upstream of the second subpanel.

In some embodiments, the step of electrically coupling the electrical component to the energy control system includes electrically coupling the first subpanel to a backup load interconnection of the first energy control system. In some embodiments, the step of electrically coupling the electrical component to the energy control system includes electrically coupling the second subpanel to a backup load interconnection of the second energy control system.

In some embodiments, the electrical system includes a PV disconnect device electrically coupled to the PV system and the energy control system. In some embodiments, the PV disconnect device is configured to electrically disconnect the PV system from the energy control system.

In some embodiments, the present disclosure provides an electrical system including a service panel electrically coupled to the utility grid. In some embodiments, the service panel includes a first feed circuit and a second feed circuit. In some embodiments, the electrical system includes a first microgrid system and a second microgrid system. In some embodiments, the first microgrid system includes a first energy control system electrically coupled to the first feed circuit and a plurality of first backup loads. In some embodiments, the first microgrid system includes a first PV power generation system electrically coupled to the first energy control system. In some embodiments, the first microgrid system includes a first energy storage system electrically coupled to the first energy control system. In some embodiments, the second microgrid system includes a second energy control system electrically coupled to the second feed circuit and a plurality of second backup loads. In some embodiments, the second microgrid system includes a second PV power generation system electrically coupled to the second energy control system. In some embodiments, the second microgrid system includes a second energy storage system electrically coupled to the second energy control system. In some embodiments, the first energy control system is configured to transmit electronic data relating to the first microgrid system over a network to a computing device. In some embodiments, the second energy control system is configured to transmit electronic data relating to the second microgrid system over the network to the computing device.

In some embodiments, the first energy control system is configured to operate in an on-grid mode electrically connecting the first PV power generation system and the first energy storage system to the utility grid and a backup mode electrically disconnecting the first PV power generation system and the first energy storage system from the utility grid.

In some embodiments, the second energy control system is configured to operate in an on-grid mode electrically connecting the second PV power generation system and the second energy storage system to the utility grid and a backup mode electrically disconnecting the second PV power generation system and the second energy storage system from the utility grid.

In some embodiments, the electronic data relating to the first microgrid system indicates at least one of a current state of charge of the first energy storage system, a power output of the first PV power generation system, and load consumption by the plurality of first backup loads.

In some embodiments, the electronic data relating to the second microgrid system indicates at least one of a current state of charge of the second energy storage system, a power output of the second PV power generation system, and load consumption by the plurality of second backup loads.

In some embodiments, the present disclosure provides methods for monitoring an electrical system including a first microgrid system and a second microgrid system. In some embodiments, the method includes a step of transmitting, by a first energy control system, electronic data relating to the first microgrid system over a network to a computing device. In some embodiments, the method includes a step of transmitting, by a second energy control system, electronic data relating to the second microgrid system over the network to the computing device. In some embodiments, the method includes a step of calculating, by the computing device, a state of the electrical system based on the electronic data relating to the first microgrid system and the electronic data relating to the second microgrid system.

In some embodiments, the method includes a step of receiving, by a user device, electronic data indicating the state of the electrical system from the computing device over the network.

In some embodiments, the electronic data relating to the first microgrid system indicates a load consumption by a plurality of first loads. In some embodiments, the electronic data relating to the second microgrid system indicates a load consumption by a plurality of second loads. In some embodiments, the state of the electrical system indicates a total load consumption based on the load consumption by the plurality of first and second loads.

In some embodiments, the electronic data relating to the first microgrid system indicates a power output by the first PV power generation system. In some embodiments, the electronic data relating to the second microgrid system indicates a power output by the second PV power generation system. In some embodiments, the state of the electrical system indicates a total power output based on the power output of the first and second PV power generation systems.

In some embodiments, the electronic data relating to the first microgrid system indicates a current state of charge of the first energy storage system. In some embodiments, the electronic data relating to the second microgrid system indicates a current state of charge of the second energy storage system. In some embodiments, the state of the electrical system indicates a total state of charge based on the current state of charge of the first and second energy storage systems.

BRIEF DESCRIPTION OF THE FIGURES

The accompanying drawings, which are incorporated herein and form part of the specification, illustrate embodiments and, together with the description, further serve to explain the principles of the embodiments and to enable a person skilled in the relevant art(s) to make and use the embodiments.

Figure 1:
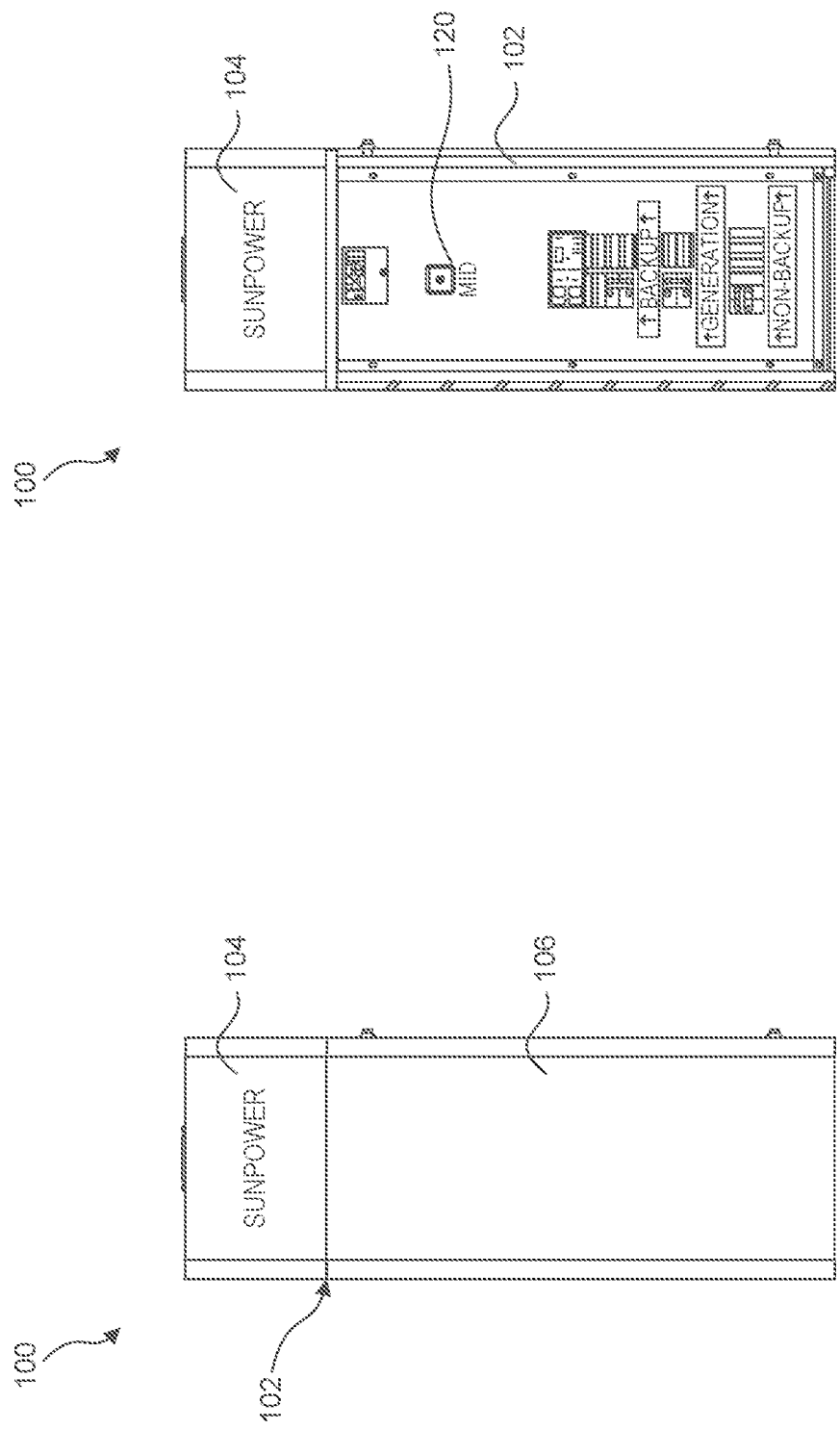
FIGS. 1A-B illustrate an energy control system according to an embodiment.

The features and advantages of the embodiments will become more apparent from the detail description set forth below when taken in conjunction with the drawings. A person of ordinary skill in the art will recognize that the drawings may use different reference numbers for identical, functionally similar, and/or structurally similar elements, and that different reference numbers do not necessarily indicate distinct embodiments or elements. Likewise, a person of ordinary skill in the art will recognize that functionalities described with respect to one element are equally applicable to functionally similar, and/or structurally similar elements.

DETAILED DESCRIPTION

Embodiments of the present disclosure are described in detail with reference to embodiments thereof as illustrated in the accompanying drawings. References to "one embodiment," "an embodiment," "some embodiments," "certain embodiments," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "about" or "substantially" or "approximately" as used herein refer to a considerable degree or extent. When used in conjunction with, for example, an event, circumstance, characteristic, or property, the term "about" or "substantially" or "approximately" can indicate a value of a given quantity that varies within, for example, 1-15% of the value (e.g., ±1%, ±2%, ±5%, ±10%, or ±15% of the value), such as accounting for typical tolerance levels or variability of the embodiments described herein.

The terms "upstream" and "downstream" as used herein refer to the location of a component of the electrical system with respect to the direction of current or power supply. For example, a first component is located "upstream" of a second component when current is being supplied from the first component to the second component, and a first component is located "downstream" of a second component when current is being supplied from the second component to the first component.

The term "main circuit breaker" as used herein refers to a circuit breaker configured to disrupt power supply from the utility feed to all or substantially all the plurality of loads associated with the electrical system.

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

For a residential electrical system, power can be distributed from a utility feed to a plurality of loads using various configurations. For example, a residential electrical system can include a service breaker panel integrated with a utility meter or the service breaker panel can be separated from the utility meter by being disposed inside the residential building. Rather than relying on a single service panel to serve all the home's electrical loads, some residential electrical systems can use multiples panels, such as a combination of a main service panel connected directly to utility feed and one or more downstream subpanels for serving one or more subsets of loads. The size of the utility feed can vary according to the energy demands of the home. For example, larger homes with multiple buildings, such as an auxiliary garage or a pool house, can require a larger utility service size (e.g., 400 A) compared to the utility service size (e.g., 200 A) for smaller residential buildings. Some residential electrical systems can also include a residential power supply system, such as a photovoltaic system or an energy storage system, that supplements the power feed received from the grid.

Due to these countless number of differences, integrating a stand-alone energy control system with various types of electrical systems can be challenging. For example, integrating a control system with a residential system having a backup photovoltaic system may not be able to serve all loads of the home if some of the home's load breaker sizes are too large (e.g., load breakers greater than 40 A). Consequently, some conventional energy control systems use multiple control panels, one panel serving small loads backed up by the photovoltaic system and another panel serving larger loads only powered by the grid. Moreover, some residential electrical systems having both an energy storage system and a photovoltaic system typically use multiple control panels such that one control panel is designated for metering feed from the photovoltaic system, whereas another panel is designated for metering feed from the energy storage system.

Thus, there is a need for procedures and systems that allow a control system to be integrated with an existing electrical system that allows the control system to use a single panel to serve various types of breaker sizes, load types, service panel types, circuit breaker locations, and/or residential power supply systems.

According to embodiments described herein, the methods of the present disclosure for integrating an energy control system with an existing electrical system can overcome one or more of these deficiencies, for example, by providing a method for integrating an energy control system with an electrical system having a utility meter connected to a utility grid, a photovoltaic (PV) system, an energy storage system, and/or a plurality of electrical loads. In some embodiments, the method includes a step of determining a site condition of the electrical system. In some embodiments, the method includes a step of determining a type of backup configuration for the electrical system based on the determined site condition. In some embodiments, the method includes a step of determining a location of at least one of a main circuit breaker, the PV system, a subpanel, and a site current transformer with respect to the energy control system based on the determined site condition and the determined type of backup configuration.

In some embodiments, the method includes a step of locating the energy control system downstream of the utility meter and upstream of at least one of the plurality of electrical loads. In some embodiments, the method includes a step of connecting at least one of the main circuit breaker, the PV system, the subpanel, and the site current transformer to the energy control system based on the determined locations. In some embodiments, the site condition include at least one of a type of service panel electrically connected to utility meter, a size of utility service supplied by the utility grid, a size of a largest load breaker associated with the plurality of loads, and a storage capacity of the energy storage system.

By locating various components of the electrical system based on the determined site conditions and backup configurations, the energy control system can be integrated with the electrical system in a manner that improves load management and efficient control of photovoltaic power supply.

Figure 2:
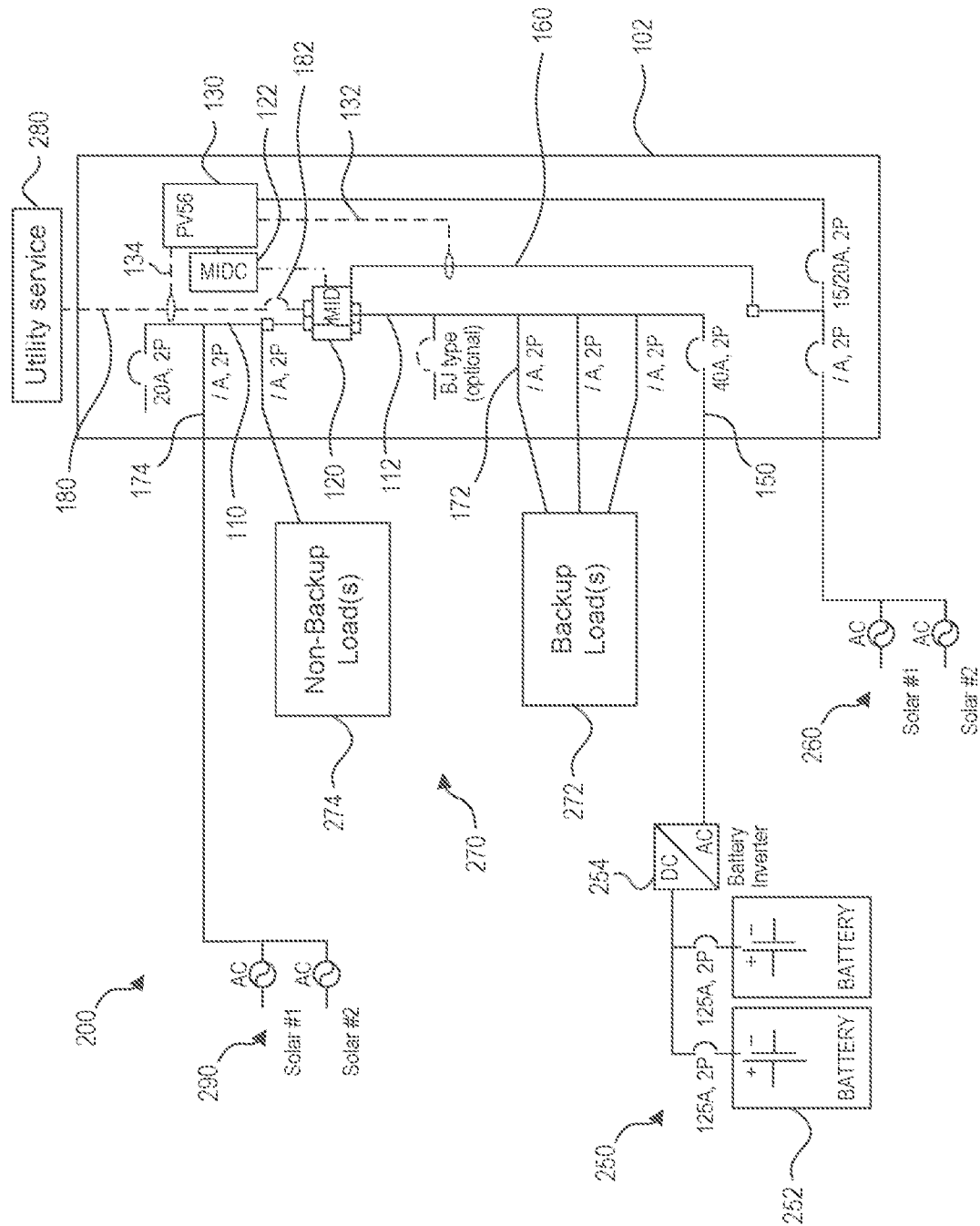
FIG. 2 illustrates an energy control system according to an embodiment.

FIGS. 1A-B and 2 show an energy control system 100 according to some embodiments. Referring first to FIG. 2, for example, in some embodiments, energy control system 100 can be integrated into an electrical system 200 (e.g., a residential electrical system) that includes, for example, an energy storage system 250, a backup photovoltaic ("PV") system 260, a plurality of electrical loads 270, a utility grid 280, and/or a non-backup PV system 290. In some embodiments, energy control system 100 can control the flow of energy between energy storage system 250, backup PV system 260, the plurality of electrical loads 270, utility grid 280, and/or non-backup PV system 290. In some embodiments, energy control system 100 and electrical system 200 can include any component or be operated in any way, as disclosed in U.S. application Ser. No. 16/811,832, filed Mar. 6, 2020, titled "ENERGY CONTROL SYSTEM," the entirety of which is incorporated herein by reference.

In some embodiments, energy storage system 250 can include one or more batteries 252. In some embodiments, energy storage system 250 can include a storage converter 254 configured to adjust a charging rate and/or a discharging rate of the one or more batteries 252.

In some embodiments, backup PV system 260 can include one or more power generation arrays (e.g., a photovoltaic panel array), and each power generation array can include one or more power generation units (e.g., a photovoltaic panel) configured to generate electrical energy. In some embodiments, backup PV system 260 can include one or more PV converters (e.g., a micro-inverter). In some embodiments, the PV converter can include any type of components (e.g., an inverter) such that the PV converter is configured to convert direct current ("DC") to alternating current ("AC") or vice versa. In some embodiments, at least one PV converter synchronizes the phase of the power feed to split-phase AC that is compatible with the utility grid. In some embodiments, the PV converter can be a part of power generation unit. In some embodiments, one, two, three, four, or more power generation units can be interconnected to a single PV converter (e.g., a string inverter). In some embodiments, backup PV system 260 can include one or more power optimizers such as, for example, DC power optimizers. In some embodiments, backup PV system 260 can include a feed circuit configured to distribute power to the energy control system 100.

In some embodiments, the plurality of electrical loads 270 can be separated into backup load(s) 272 and non-backup load(s) 274. In some embodiments, a plurality of backup loads 272 include one or more essential electrical loads that continue to receive power from the backup PV system 260 and/or energy storage system 250 during a power grid outage, and a plurality of non-backup loads 274 includes one or more non-essential loads that do not receive power from the backup PV system 260 and/or energy storage system 250 during a utility power outage. In the context of the present disclosure, an electrical load can be, for example, one or more devices or systems that consume electricity. In some embodiments, the plurality of electrical loads 270 can include all or some of the electrical devices associated with a building (e.g., a residential home). In some embodiments, the plurality of electrical loads 270 can include 240-volt loads. In some embodiments, the plurality of electrical loads 270 can include, for example, an electric range/oven, an air conditioner, a heater, a hot water system, a swimming pool pump, and/or a well pump. In some embodiments, the plurality of electrical loads 270 can include 120-volt loads. In some embodiments, the plurality of electrical loads 270 can include, for example, power outlets, lighting, networking and automation systems, a refrigerator, a garbage disposal unit, a dishwasher, a washing machine, other appliance, a septic pump, and/or an irrigation system.

In some embodiments, non-backup PV system 290 can include one or more power generation arrays (e.g., a photovoltaic panel array), and each power generation array can include one or more power generation units (e.g., a photovoltaic panel). In some embodiments, non-backup PV system 290 can include one or more PV converters. In some embodiments, PV converter can include the features of any one of the converters described herein.

In some embodiments, energy control system 100 can include any number of interconnections to control the flow of energy between energy storage system 250, backup PV system 260, the plurality of electrical loads 270, utility grid 280, and/or non-backup PV system 290. For example, in some embodiments, energy control system 100 can include a grid interconnection 180 electrically coupled to a utility grid 280 so that grid power is distributed to energy control system 100. In some embodiments, grid interconnection 180 can include a main overcurrent protection device 182 that is electrically disposed between utility grid 280 and other components of energy control system 100. In some embodiments, energy control system can include a non-backup power bus 110 (e.g., 125 A rating bus) having one or more non-backup load interconnections 174 electrically coupled to the plurality of non-backup loads 274 and a non-backup PV interconnection 190 electrically coupled to non-backup PV system 290. In some embodiments, energy control system 100 can include a backup power bus 112 (e.g., 200 A rating bus) having one or more backup load interconnections 172 electrically coupled to the plurality of backup loads 272 and a storage interconnection 150 electrically coupled to energy storage system 250. In some embodiments, energy control system 100 can include a backup photovoltaic interconnection 160 (e.g., 125 A rating bus) electrically coupled to backup PV system 260. In the context of the present disclosure, an interconnection includes any suitable electrical structure, such as a power bus, wiring, a panel, etc., configured to establish electrical communication between two sets of circuits. Any one of interconnections 150, 160, 172, 174, 180, and 190 can include an AC bus, a panel, a sub-panel, a circuit breaker, any type of conductor, or a combination thereof.

In some embodiments, energy control system 100 can include a microgrid interconnection device 120 (e.g., an automatic transfer or disconnect switch) electrically coupled to non-backup power bus 110 (e.g., located on a load side of microgrid interconnection device 120) and backup power bus 112 (e.g., located on a line side of microgrid interconnection device 120), such that microgrid interconnection device 120 is electrically coupled to storage interconnection 150, backup PV interconnection 160, backup load interconnection 172, non-backup load interconnection 174, and/or non-back PV interconnection 190. In some embodiments, microgrid interconnection device 120 is electrically coupled (e.g., directly) to grid interconnection 180. In the context of the present disclosure, a microgrid interconnection device can be, for example, any device or system that is configured to automatically connect circuits, disconnect circuits, and/or switch one or more electrical loads between power sources. In some embodiments, microgrid interconnection device 120 can include any combination of switches, relays, and/or circuits to selectively connect and disconnect respective interconnections 150, 160, 172, 174, 180, and 190 electrically coupled to energy control system 100. In some embodiments, such switches can be automatic disconnect switches that are configured to automatically connect circuits and/or disconnect circuits. In some embodiments, such switches can be transfer switches that are configured to automatically switch one or more electrical loads between power sources.

In some embodiments, microgrid interconnection device 120 can be configured to operate under an on-grid mode, in which microgrid interconnection device 120 electrically connects the backup power bus 112 to both the non-backup power bus 110 and grid interconnection 180. In some embodiments, when operating under the on-grid mode, microgrid interconnection device 120 can be configured to distribute electrical energy received from utility grid 280 and/or non-backup PV system 290 to backup loads 272. In some embodiments, when operating under the on-grid mode, microgrid interconnection device 120 can be configured to distribute electrical energy received from energy storage system 250 and/or backup PV system 260 to non-backup loads 274.

In some embodiments, microgrid interconnection device 120 can be configured to operate under a backup mode, in which microgrid interconnection device 120 electrically disconnects both non-backup power bus 110 and grid interconnection 180 from backup power bus 112 and backup PV interconnection 160. In some embodiments, when operating under the backup mode, microgrid interconnection device 120 can disrupt electrical energy received from non-backup PV system 290 from reaching backup loads 272. In some embodiments, when operating under the backup mode, microgrid interconnection device 120 can disrupt electrical communication between backup loads 272 and utility grid 280. In some embodiments, when operating under the backup mode, microgrid interconnection device 120 can disrupt electrical energy received from energy storage system 250 and/or backup PV system 260 from reaching non-backup loads 274.

In some embodiments, energy control system 100 can include a controller 122 in communication with microgrid interconnection device 120 and configured to control the distribution of electrical energy between energy storage system 250, backup PV system 260, the plurality of electrical loads 270, utility grid 280, and/or non-backup PV system 290. In some embodiments, controller 122 can be configured to detect the status (e.g., power outage or voltage restoration) of grid interconnection 180 and switch microgrid interconnection device 120 between the on-grid mode and the backup mode based on the status of grid interconnection 180. If the status of grid interconnection 180 indicates a power outage, controller 122 can be configured to switch microgrid interconnection device 120 to the backup mode. If the status of grid interconnection 180 indicates a voltage restoration, controller 122 can be configured to switch microgrid interconnection device 120 to the on-grid mode.

In some embodiments, energy control system 100 includes a PV monitoring system 130. In some embodiments, PV monitoring system 130 includes a communication interface (e.g., one or more antennas) for sending and/or receiving data over a wireless network. In some embodiments, energy control system 100 includes one or more load meters that monitor the current or voltage through certain elements of electrical system 200 and transmit data indicating the monitored current or voltage to PV monitoring system 130 and controller 122. For example, a load meter can monitor the flow of electricity from microgrid interconnection device 120 to backup load interconnection 172. A load meter can monitor the flow of electricity from microgrid interconnection device 120 to backup PV interconnection 160 and non-backup PV interconnection 190. A load meter can monitor the flow of electricity from utility grid 280 to microgrid interconnection device 120.

In some embodiments, PV monitoring system 130 can include a site consumption current transformer 132 (site CT) for monitoring the quantity of energy consumption by the plurality of electrical loads 270. In some embodiments, site CT 132 can be operatively connected to grid interconnection 180. In some embodiments, PV monitoring system 130 can include a PV production CT 134 for monitoring the quantity of PV energy outputted from backup PV system 260. In some embodiments, PV production CT 134 can be operatively linked to backup PV interconnection 160.

In some embodiments, PV monitoring system 130 can read time series data and/or disable a reconnection timer of backup PV system 260 and/or non-backup PV system 290. In some embodiments, PV monitoring system 130 can initiate a grid reconnection timer of backup PV system 260. In some embodiments, PV monitoring system 130 can communicate with a battery monitoring system ("BMS") of energy storage system 250. In some embodiments, PV monitoring system 130 can communicate with energy storage system 250 and can, for example, read time series data, read power information, write charge/discharge targets, and/or write "heartbeats." In some embodiments, PV monitoring system 130 can receive status and/or power information from microgrid interconnection device 120.

In some embodiments, electrical system 200 can include a PV disconnect device electrically coupled to a feed circuit of backup PV system 260 or the feed circuit of non-backup PV power generation system 290. In some embodiments, electrical system 200 can include multiple PV disconnect devices, including, for example, a first PV disconnect device electrically coupled to the feed circuit of backup PV system 260 and a second PV disconnect device electrically coupled to the feed circuit of non-backup PV system 290. In some embodiments, a PV disconnect device can be disposed inside housing 102 of energy control system 100. In some embodiments, a PV disconnect device can be disposed outside of housing 102. The PV disconnect device can be incorporated in all the embodiments and methods described herein.

In some embodiments, PV disconnect device can include any component or be operated in any way, as disclosed in U.S. application Ser. No. 17/324,715, filed May 19, 2021, titled "PHOTOVOLTAIC DISCONNECT DEVICE FOR STORAGE INTEGRATION," the entirety of which is incorporated herein by reference. For example, in some embodiments, a PV disconnect device can be configured to monitor electronic data, such as AC voltage, current, and frequency measurements across the feed circuit of backup PV system 260 and/or non-backup PV system 290. In some embodiments, a PV disconnect device can be configured to electrically disconnect the feed circuit of backup PV system 260 and/or non-backup PV system 290 from microgrid interconnection device 120. In some embodiments, a PV disconnect device can include any suitable component, such as, for example, an electromechanical relay, a solid-state relay, and/or a controllable alternating current breaker, for electrically disconnecting the feed circuit of backup PV system 260 and/or non-backup PV system 290 from microgrid interconnection device 120. In some embodiments, a PV disconnect device can be in communication with a controller, such as, for example, controller 122 or PV monitoring system 130 of energy control system 100, to collect electronic data of backup PV system 260 and/or non-backup PV system 290 and to receive commands for selectively connecting and disconnecting the electrical connection between backup PV system 260 and/or non-backup PV system 290 from microgrid interconnection device 120.

In some embodiments, controller 122 can be linked (e.g., wired or wirelessly) to PV monitoring system 130 such that controller 122 receives electronic data related to backup PV system 260 and/or non-backup PV system 290 from PV monitoring system 130. In some embodiments, controller 122 can transmit commands to PV monitoring system 130 to adjust (e.g., increase or decrease) power output of backup PV system 260 and/or non-backup PV system 290 based on received data. In some embodiments, controller 122 can be configured as a master controller and PV monitoring system 130 can be configured to communicate electronic data (e.g., status of power generation) with controller 122 such that controller 122 controls control energy distribution based on the electronic data transmitted by PV monitoring system 130.

In some embodiments, electrical components (e.g., interconnections, switches, relays, AC bus) of energy control system 100 can be integrated into a single housing. For example, as shown in FIGS. 1A-B, in some embodiments, energy control system 100 can include a housing 102. In some embodiments, housing 102 can be comprised of plastic, metal, or a combination of plastic and metal. In some embodiments, energy control system 100 can include a cover 104 enclosing one or more components (e.g., a PV monitoring system) disposed in housing 102 of energy control system 100. In some embodiments, cover 104 can be comprised of plastic, metal, or a combination of plastic and metal. In some embodiments, cover 104 can be rotatably and/or removably connected to housing 102. In some embodiments, energy control system 100 can include a door 106 that is configured to be opened and closed to access components (e.g., switches) mounted within housing 102, for example on a mounting plate.

In some embodiments, energy control system 100 can be integrated into and operatively compatible with multiple types of residential electrical systems that include various types of PV systems, energy storage systems, electrical loads, and/or utility grid interconnections. The most efficient procedure for integrating energy control system 100 with a particular residential electrical system can vary compared to other residential electrical systems based on one or more site conditions associated with the particular residential electrical system.

Figure 3:
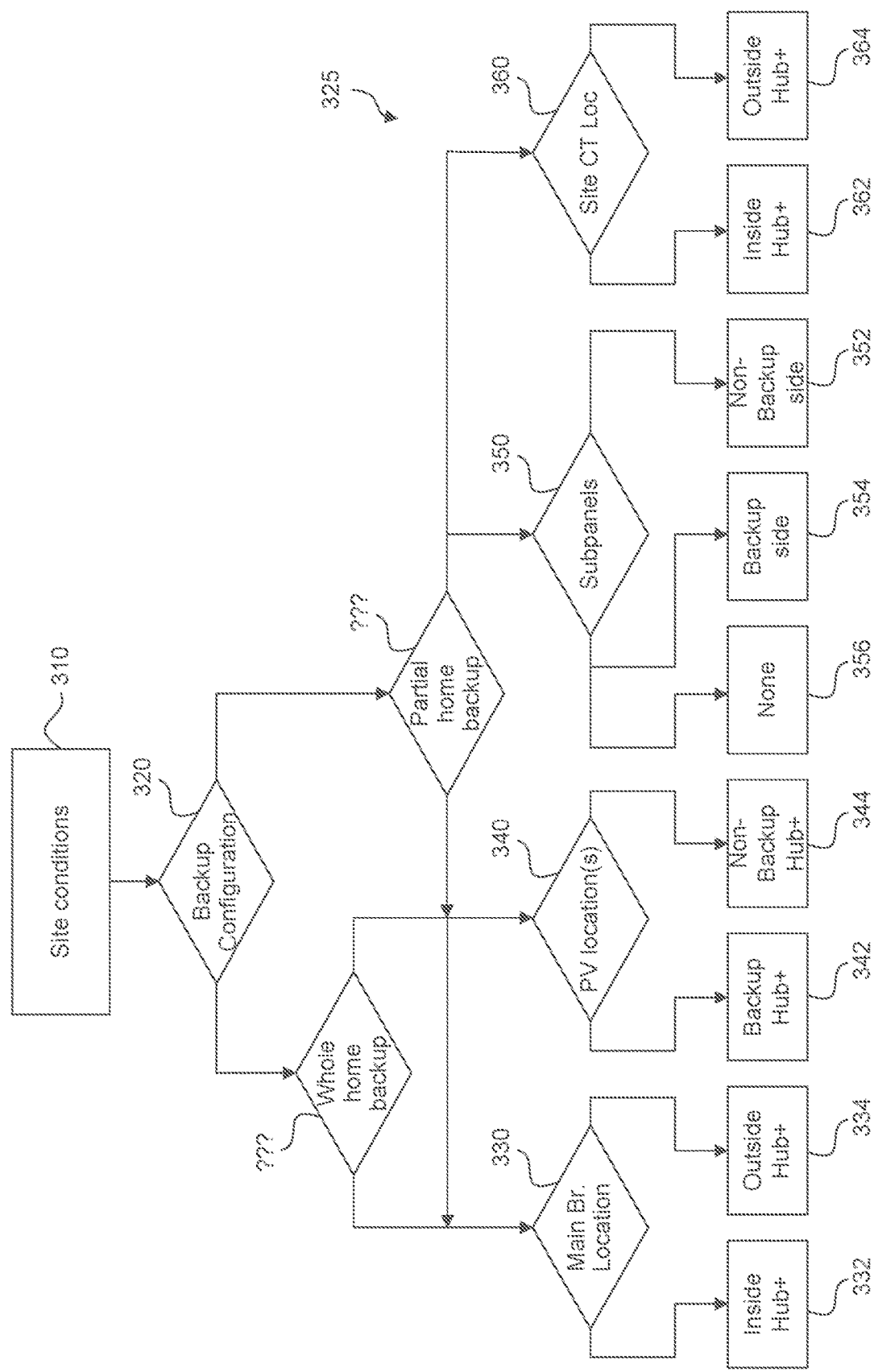
FIG. 3 illustrates a block diagram showing aspects of a method of integrating an energy control system to an existing residential home according to an embodiment.

FIG. 3 shows an example block diagram illustrating aspects of a method 300 for integrating energy control system 100 into an existing electrical system, such as, for example, a residential electrical system (e.g., electrical system 200).

In some embodiments, method 300 can include a step 310 of determining one or more site conditions of the existing electrical system. In some embodiments, the one or more site conditions indicate the state of the existing electrical system. In some embodiments, the one or more site conditions include the type of main service panel connected to the utility grid, such as, for example, main service panels integrated with utility meters and main service panels spatially separated from utility meters. In some embodiments, the one or more site conditions can include the size of utility service, such as for example, 100 A, 200 A, and 400 A service panels. In some embodiments, the one or more site conditions can include the size of largest load breakers in the electrical system, such as for example, 40 A circuit breakers, 50 A circuit breakers, and 60 A circuit breakers. In some embodiments, the one or more site conditions can include the type of electrical loads, such as, for example, distinguishing between critical electrical loads (e.g., lighting, router) and non-critical electrical loads (e.g., air conditioner, oven). In some embodiments, the one or more site conditions can include the state of the existing electrical infrastructure, such as, for example, the age of the service panels. In some embodiments, the one or more site conditions can include the capacity of the energy storage system (e.g., storage system 250) linked to the service panel, such as, for example, the number of storage batteries and storage inverters.

In some embodiments, method 300 can include a step 320 of determining the backup configuration for the electrical system based on the one or more site conditions. In some embodiments, step 320 can include determining a partial home backup configuration, in which the plurality of electrical loads associated with the electrical system are split into backup loads (e.g., backup loads 272) and non-backup loads (e.g., non-backup loads 274). In some embodiments, step 320 can include determining a whole home backup configuration, in which all or substantially all the electrical loads associated with the electrical system are connected to the backup power bus 112 of energy control system 100.

In some embodiments, the one or more site conditions of the existing electrical system can only permit a partial home backup configuration because one or more of the electrical loads need to be electrically coupled to the non-backup power bus 110 via non-backup load interconnection 174. For example, in some embodiments, if the service panel type of the electrical system includes a main service panel integrated with the utility meter, energy control system 100 is disposed downstream of the main service panel, where large electrical loads coupled to the main service panel are migrated to the non-backup power bus 110 via non-backup load interconnection 174. In some embodiments, any large load break size above 40 A is electrically coupled to non-backup power bus 110 via non-backup load interconnection 174. In some embodiments, if the electrical system includes a PV system split into a backup PV system and a non-backup PV system, then non-backup PV system is electrically coupled to the non-backup power bus 110 of energy control system 100.

In some embodiments, after determining the site conditions of the electrical system (e.g., step 310) and determining the backup configuration of the electrical system (e.g., step 320), method 300 can include a step 325 of determining a location of an electrical component with respect to energy control system 100 based on the one or more site conditions and/or the selected backup configuration for the electrical systems. As shown in FIG. 3, in some embodiments, step 325 can include one or more steps (e.g., steps 330, 340, 350, and/or 360) for determining the location of electrical components of the electrical system (e.g., electrical system 200) with respect to energy control system 100 based on the one or more site conditions and/or the selected backup configuration for the electrical systems. By determining the location of the electrical components of the existing electrical system with respect to energy control system 100 based on the one or more site conditions and/or the selected backup configuration for the electrical systems, energy control system 100 can be integrated with an existing electrical system in a manner most suitable for the specific site conditions, such as regulating power supply from backup PV system 260 and energy storage system 250 more efficiently or ensuring proper load management.

In some embodiments, method 300 can include a step 330 of determining the location of main circuit breaker with respect to energy control system 100 based on the one or more site conditions and/or the selected backup configuration for the electrical system. In some embodiments, the main circuit breaker can be configured to disrupt electrical connection between utility grid (e.g., utility grid 280) and the rest of the components (e.g., the plurality of electrical loads 170, the main service panel) of the electrical system in response to power surges that exceed threshold power limits. In some embodiments, step 330 can include a sub-step 332 of locating the main circuit breaker within the housing 102 of energy control system 100, such as, for example, when energy control system 100 can completely replace the existing main service panel and/or be installed in a new home that does not include an existing main service panel. In some embodiments, step 330 can include a sub-step 334 of locating the main circuit breaker outside and upstream of the housing 102 of energy control system 100, such as, for example, when energy control system 100 is disposed downstream of the existing main service panel.

In some embodiments, method 300 can include a step 340 of determining the location of the PV systems with respect to energy control system 100 based on the one or more site conditions and/or the selected backup configuration for the electrical system. In some embodiments, step 340 can include a sub-step 342 of electrically connecting a backup PV system to backup PV interconnection 160. In some embodiments, step 340 can include a sub-step 344 of electrically connecting a non-backup PV system to a non-backup PV interconnection 190.

In some embodiments, method 300 can include a step 350 of determining the location of the subpanels of the electrical system with respect to energy control system 100 based on the one or more site conditions and/or the selected backup configuration for the electrical system. In some embodiments, a subpanel can be located downstream of a main service panel and be configured to control power distribution to one or more subsets of electrical loads, In some embodiments, the electrical system can not include any subpanels for servicing electrical loads (e.g., no panels 356 shown in FIG. 3). In some embodiments, the electrical system can include a sub-step 352 of electrically connecting service panels to the grid interconnection 180 on the non-backup side of energy control system 100, such as, for example, when the service size of utility grid is 400 A split into two 200 A feeders. In some embodiments, the electrical system can include a sub-step 354 of electrically connecting service panels to the backup power bus 112 via backup load interconnection 172, such as, for example, when the electrical system includes a downstream subpanel electrically coupled to all the electrical loads of the residential home.

In some embodiments, method 300 can include a step 360 of determining the location of the site current transformer (site CT) with respect to the energy control system 100 based on the one or more site conditions and/or the selected backup configuration for the electrical system. In some embodiments, site CT is configured to monitor energy consumption by the plurality of electrical loads. In some embodiments, step 360 can include a sub-step 362 of locating site CT within housing 102 of energy control system 100, such as, for example, when all electrical loads of the electrical system are connected to energy control system 100. In some embodiments, step 360 can include a sub-step 364 of locating site CT outside the housing 102 of the energy control system 100, such as, for example, when one or more electrical loads are not connected to the energy control system 100.

In some embodiments, method 300 can include a step of determining the number and location of one or more PV disconnect devices with respect to energy control system 100 based on the one or more site conditions and/or the selected backup configuration for the electrical system. For example, in some embodiments, for example, under a partial backup configuration, electrical system can include a first PV disconnect device electrically coupled to the feed circuit of a backup PV system and a second PV disconnect device electrically coupled to the feed circuit of a non-backup PV system. In some embodiments, for example, under a whole home backup configuration, electrical system can include a PV disconnect device electrically coupled to the feed circuit of a backup PV system.

FIGS. 4-22B show ways of integrating energy control system 100 with different electrical systems.

Figure 4:
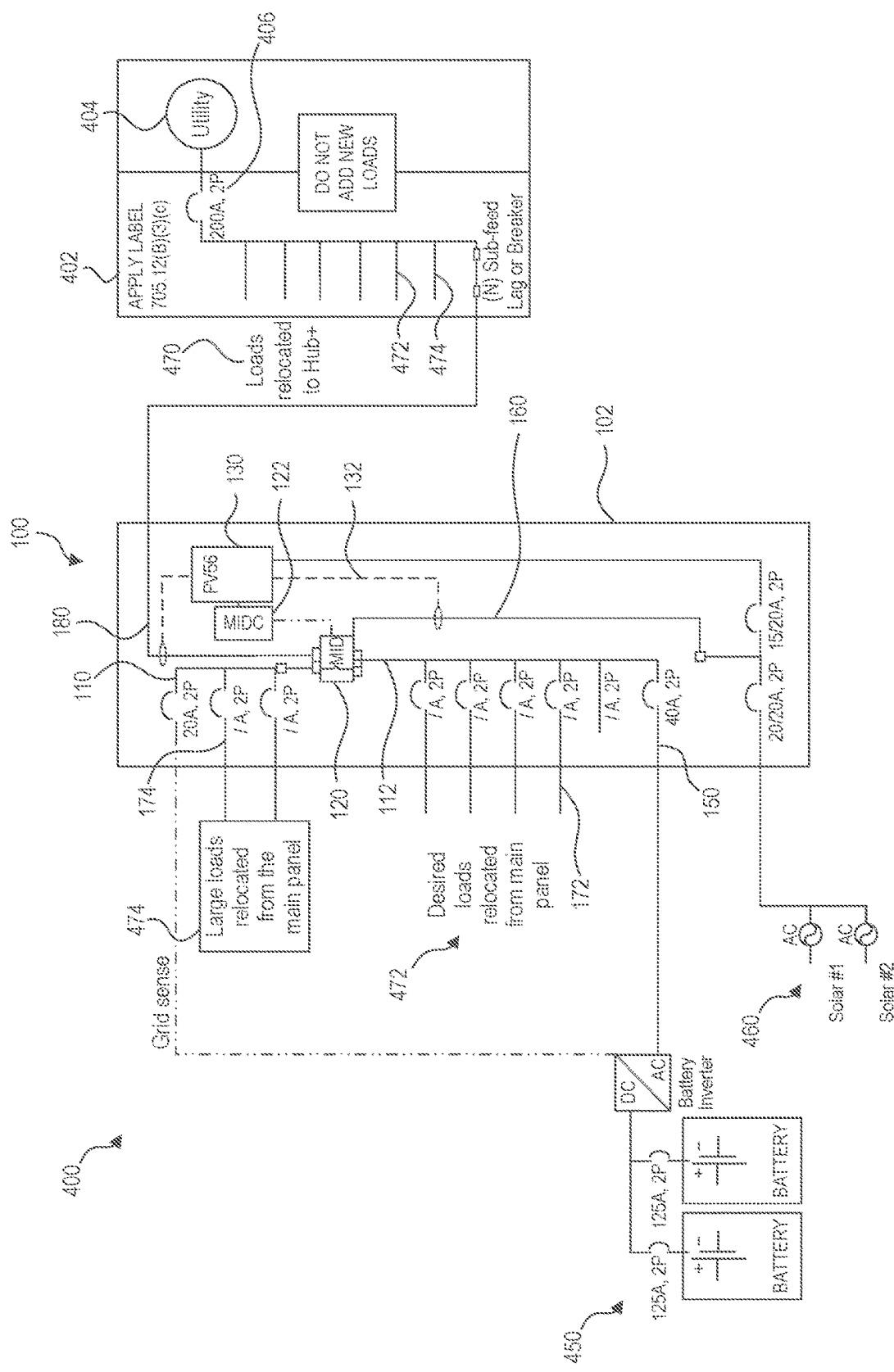
FIG. 4 illustrates an electrical system according to an embodiment.

FIG. 4 shows an electrical system 400, in which energy control system 100 is supplemented with a meter combination panel (e.g., main service panel 402). As shown in FIG. 4, in some embodiments, electrical system 400 can include a main service panel 402 integrated with a utility meter 404. In some embodiments, main service panel 402 can include a main circuit breaker 406. In some embodiments, main service panel 402 can be connected to a plurality of electrical loads 470. In some embodiments, the plurality of electrical loads 470 can include small electrical loads 472 having a breaker size of 40 A or less (e.g., lighting, router, television) and large electrical loads 474 having a breaker size greater than 40 A (e.g., air conditioner system, oven). In some embodiments, electrical system 400 can include an energy storage system 450 that includes the features of other energy storage systems (e.g., storage system 250) described herein. In some embodiments, electrical system 400 can include a backup PV system 460 that includes the features of other backup PV systems (e.g., backup PV system 260) described herein. In some embodiments, electrical system 400 does not include any subpanels.

In some embodiments, a method (e.g., method 300) for integrating energy control system 100 with electrical system 400 includes setting the energy control system 100 in a partial home backup configuration. In some embodiments, the method for integrating energy control system 100 with electrical system 400 includes locating energy control system 100 downstream from main service panel 402, where the main circuit breaker 406 remains in the main service panel 402, not within the housing of energy control system 100. In some embodiments, the method (e.g., method 300) for integrating energy control system 100 with electrical system 400 includes migrating the plurality of electrical loads 470 to energy control system 100 by connecting small electrical loads 472 to the backup power bus 112 via one or more backup load interconnections 172 and large electrical loads 474 to the non-backup power bus 110 via non-backup load interconnections 174. In some embodiments, the method for integrating energy control system 100 with electrical system 400 includes connecting energy storage system 450 to backup power bus 112 via storage interconnection 150. In some embodiments, the method for integrating energy control system 100 with electrical system 400 includes connecting backup PV system 460 to backup PV interconnection 160. In some embodiments, the method for integrating energy control system 100 with electrical system 400 includes locating site CT 132 within the housing of energy control system 100 if all the loads 470 are connected to energy control system 100. In some embodiments, the method for integrating energy control system 100 with electrical system 400 includes locating site CT 132 upstream of energy control system 100 and outside the housing of energy control system 100 if one or more electrical loads 470 remain connected to main service panel 402.

Figure 5:
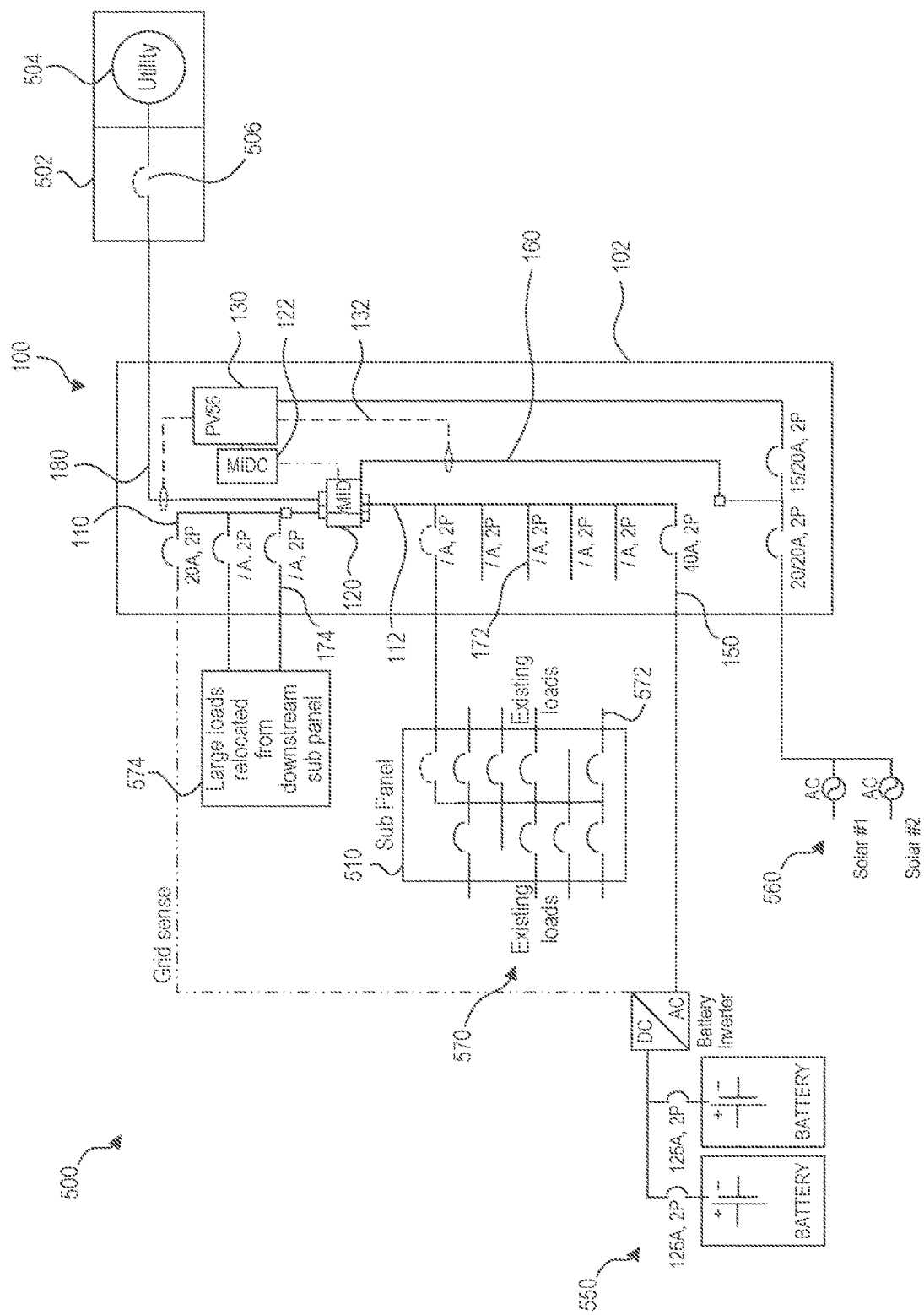
FIG. 5 illustrates an electrical system according to an embodiment.

FIG. 5 shows an electrical system 500, in which energy control system 100 is supplemented with a meter panel (e.g., meter panel 502). As shown in FIG. 5, in some embodiments, electrical system 500 can include a meter panel 502 having a utility meter 504 and not electrically coupled directly to any electrical loads. In some embodiments, meter panel 502 can include a main circuit breaker 506. In some embodiments, electrical system 500 can include a downstream subpanel 510 connected to a plurality of electrical loads 570. In some embodiments, the plurality of electrical loads 570 can include small electrical loads 572 having a breaker size of 40 A or less (e.g., lighting, router, television) and large electrical loads 574 having a breaker size greater than 40 A (e.g., air conditioner system, oven). In some embodiments, electrical system 500 can include an energy storage system 550 that includes the features of other energy storage systems (e.g., storage system 250) described herein. In some embodiments, electrical system 500 can include a backup PV system 560 that includes the features of other backup PV systems (e.g., backup PV system 260) described herein.

In some embodiments, a method (e.g., method 300) for integrating energy control system 100 with electrical system 500 includes setting the energy control system 100 in a whole home backup configuration or a partial home backup configuration. In some embodiments, the method for integrating energy control system 100 with electrical system 500 includes locating energy control system 100 downstream from meter panel 502 and upstream from subpanel 510. In some embodiments, the main circuit breaker 506 remains in the meter panel 502, not within the housing of energy control system 100. In some embodiments, the method (e.g., method 300) for integrating energy control system 100 with electrical system 500 includes connecting subpanel 510 to backup power bus 112 via backup load interconnection 172, when energy control system 100 is set as a whole home backup configuration or partial backup configuration. In some embodiments, when setting energy control system as a partial home backup configuration, the method for integrating energy control system 100 includes connecting large electrical loads 574 to the non-backup power bus 110 via non-backup load interconnections 174. In some embodiments, when setting energy control system as a whole home backup configuration, the method for integrating energy control system 100 includes determining that the largest breaker size of the plurality of electrical loads 570 is 40 A or less. In some embodiments, the method for integrating energy control system 100 with electrical system 500 includes connecting energy storage system 550 to backup power bus 112 via storage interconnection 150. In some embodiments, the method for integrating energy control system 100 with electrical system 500 includes connecting backup PV system 560 to backup PV interconnection 160. In some embodiments, the method for integrating energy control system 100 with electrical system 500 includes locating site CT 132 within the housing of energy control system 100 if all the electrical loads 570 are connected to energy control system 100. In some embodiments, the method for integrating energy control system 100 with electrical system 500 includes locating site CT 132 upstream of energy control system 100 and outside the housing of energy control system 100 if one or more electrical loads 570 are not connected to energy control system 100.

Figure 6:
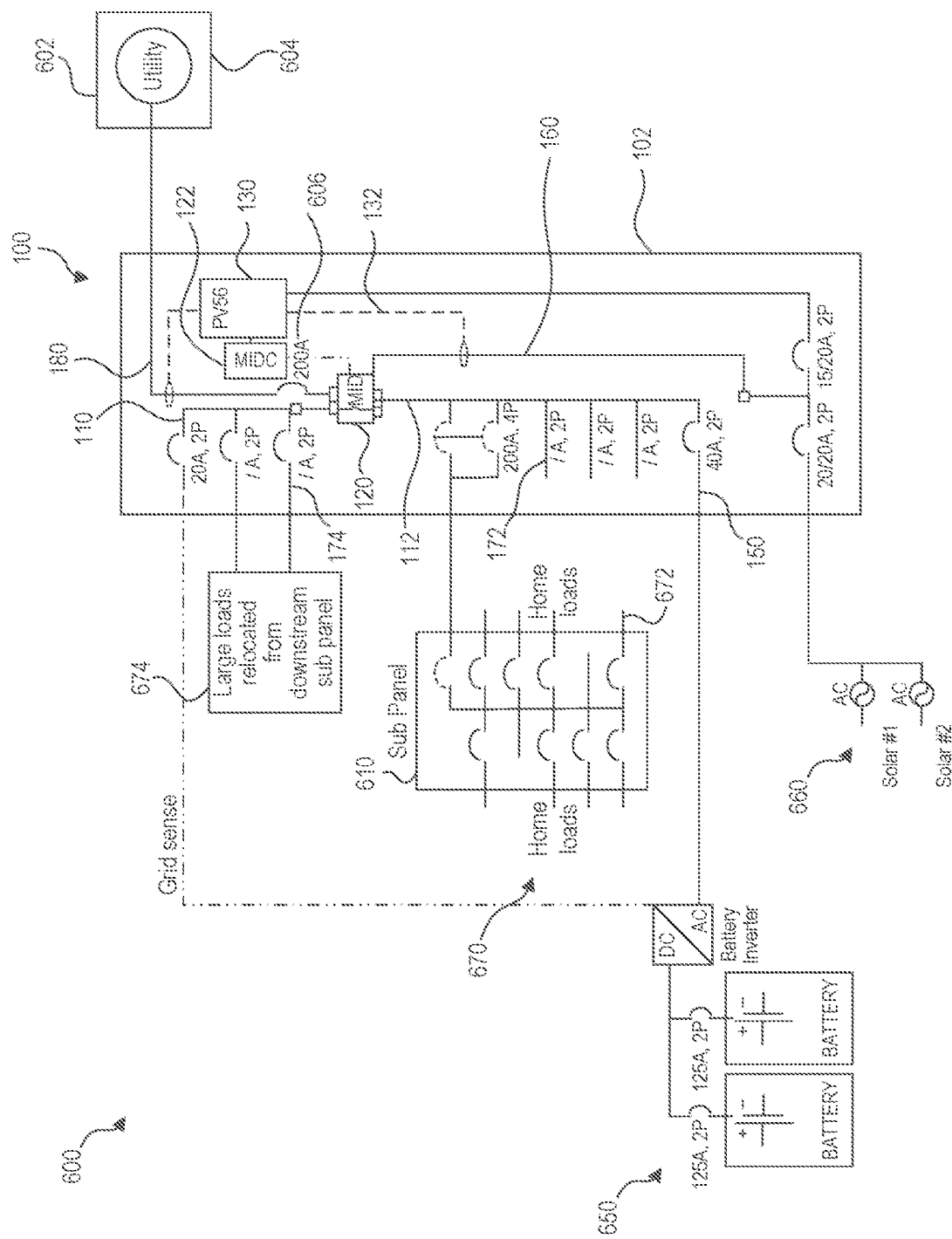
FIG. 6 illustrates an electrical system according to an embodiment.

FIG. 6 shows an electrical system 600, in which energy control system 100 is configured as the main service panel, such as, for example, when integrating energy control system 100 into an electrical system for a new home. As shown in FIG. 6, in some embodiments, electrical system 600 can include a utility meter 604 without having a main service panel connected to utility meter 604. In some embodiments, electrical system 600 can include a downstream subpanel 610 connected to a plurality of electrical loads 670. In some embodiments, the plurality of electrical loads 670 can include small electrical loads 672 having a breaker size of 40 A or less (e.g., lighting, router, television) and large electrical loads 674 having a breaker size greater than 40 A (e.g., air conditioner system, oven). In some embodiments, electrical system 600 can include an energy storage system 650 that includes the features of other energy storage systems (e.g., storage system 250) described herein. In some embodiments, electrical system 600 can include a backup PV system 660 that includes the features of other backup PV systems (e.g., backup PV system 260) described herein.

In some embodiments, a method (e.g., method 300) for integrating energy control system 100 with electrical system 600 includes setting the energy control system 100 in a partial home backup configuration. In some embodiments, the method for integrating energy control system 100 with electrical system 600 includes locating energy control system 100 downstream from utility meter 604 and upstream from subpanel 610. In some embodiments, energy control system 100 is configured to serve as a standalone service panel for electrical system 600 by (1) locating main circuit breaker 606 within the housing of energy control system 100, (2) identifying main circuit breaker 606 as "Service Disconnect" to be complaint with National Electric Code (NEC) 230.66, (3) bonding a neutral conductor bar to a grounded equipment conductor bar of energy control system 100 to be compliant with NEC 250.24(c), and (4) locating site CT 132 within the housing of energy control system 100.

In some embodiments, the method (e.g., method 300) for integrating energy control system 100 with electrical system 600 includes connecting subpanel 610 to backup power bus 112 via backup load interconnection 172. In some embodiments, the method for integrating energy control system 100 includes connecting large electrical loads 674 to the non-backup power bus 110 via non-backup load interconnections 174. In some embodiments, the method for integrating energy control system 100 with electrical system 600 can include locating an overcurrent protection device (e.g., a 4-pole quad circuit breaker) of subpanel 610 within subpanel 610 or within the housing of energy control system 100. In some embodiments, the method for integrating energy control system 100 with electrical system 600 includes connecting energy storage system 650 to backup power bus 112 via storage interconnection 150. In some embodiments, the method for integrating energy control system 100 with electrical system 600 includes connecting backup PV system 660 to backup PV interconnection 160.

Figure 7:
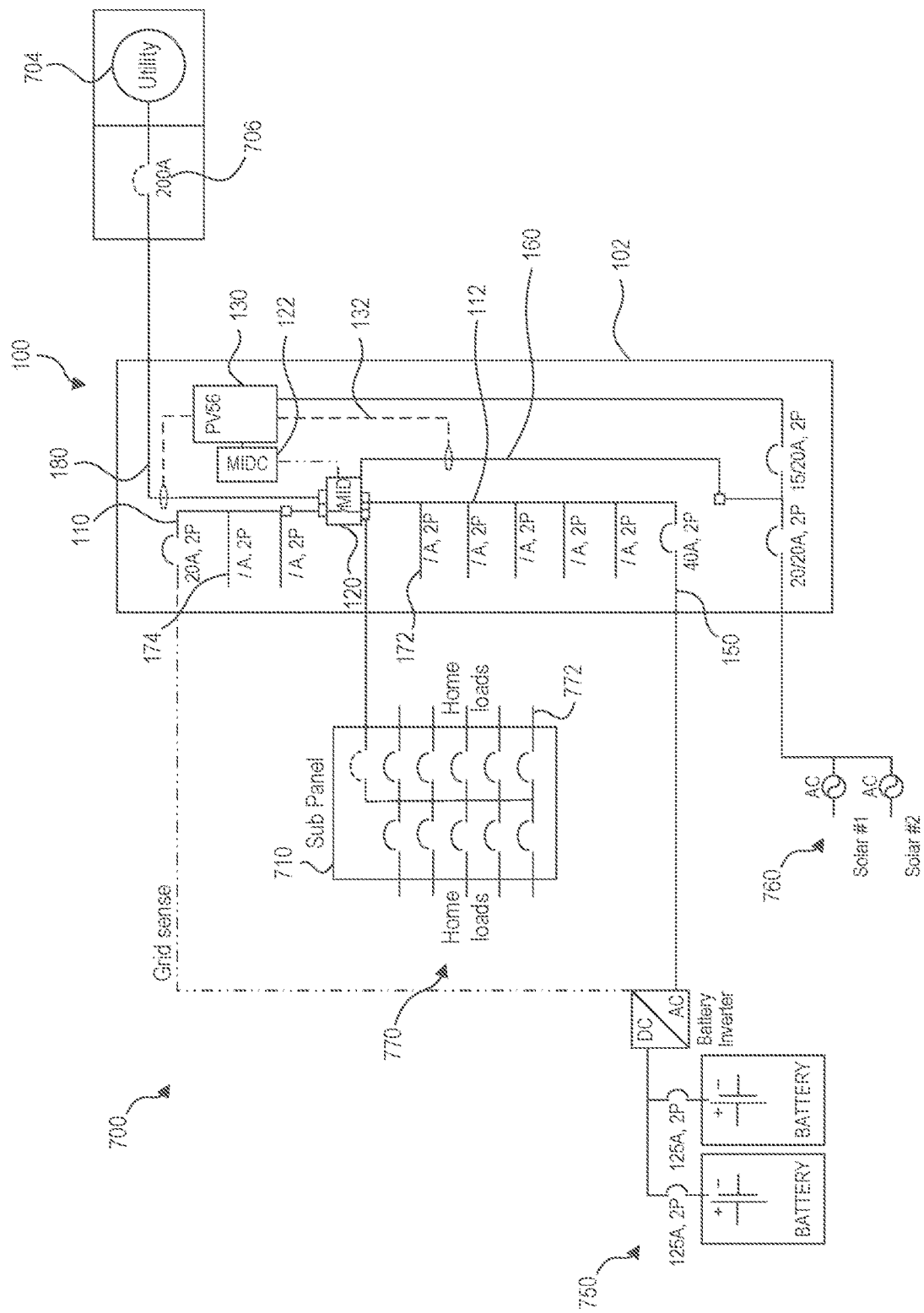
FIG. 7 illustrates an electrical system according to an embodiment.

FIG. 7 shows an electrical system 700, in which a main circuit breaker (e.g., main circuit breaker 706) is disposed upstream of energy control system 100. As shown in FIG. 7, in some embodiments, electrical system 700 can include a utility meter 704 without having a main service panel connected to utility meter 704. In some embodiments, electrical system can include a main circuit breaker 706 located proximate to utility meter 704, where utility meter 704 and main circuit breaker 706 are located outside of a home. In some embodiments, electrical system 700 can include a downstream subpanel 710 connected to a plurality of small electrical loads 772 having a breaker size of 40 A or less (e.g., lighting, router, television). In some embodiments, electrical system 700 can include an energy storage system 750 that includes the features of other energy storage systems (e.g., storage system 250) described herein. In some embodiments, electrical system 700 can include a backup PV system 760 that includes the features of other backup PV systems (e.g., backup PV system 260) described herein.

In some embodiments, a method (e.g., method 300) for integrating energy control system 100 with electrical system 700 includes setting the energy control system 100 in a whole home backup configuration. In some embodiments, the method for integrating energy control system 100 with electrical system 700 includes locating energy control system 100 downstream from utility meter 704 and upstream of subpanel 710. In some embodiments, the method (e.g., method 300) for integrating energy control system 100 with electrical system 700 includes connecting subpanel 710 to the load side of microgrid interconnection device 120, whereby the backup power bus 112 is not connected to any of the electrical loads. In some embodiments, the method for integrating energy control system 100 with electrical system 700 includes connecting energy storage system 750 to backup power bus 112 via storage interconnection 150. In some embodiments, the method for integrating energy control system 100 with electrical system 700 includes connecting backup PV system 760 to backup PV interconnection 160.

Figure 8:
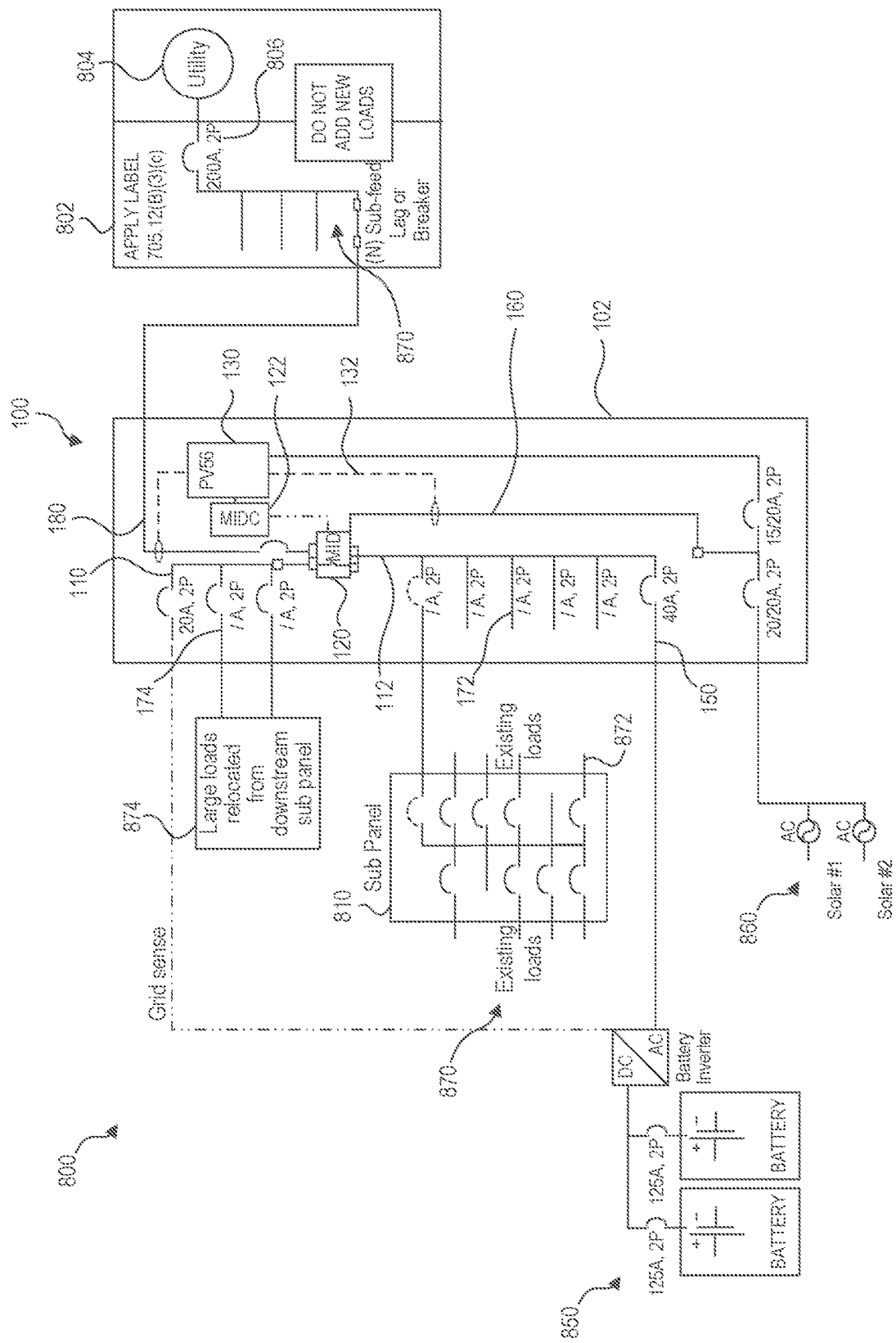
FIG. 8 illustrates an electrical system according to an embodiment.

FIG. 8 shows an electrical system 800, in which an existing subpanel feeder (e.g., subpanel 810) is disposed downstream of energy control system 100 set in a partial backup configuration. As shown in FIG. 8, in some embodiments, electrical system 800 can include a main service panel 802 integrated with a utility meter 804. In some embodiments, main service panel 802 can include a main circuit breaker 806. In some embodiments, main service panel 802 can be connected to one or more electrical loads 870. In some embodiments, electrical system 800 can include a subpanel 810 located downstream of main service panel 802 connected to a plurality of electrical loads 870. In some embodiments, the plurality of electrical loads 870 can include small electrical loads 872 having a breaker size of 40 A or less (e.g., lighting, router, television) and large electrical loads 874 having a breaker size greater than 40 A (e.g., air conditioner system, oven). In some embodiments, electrical system 800 can include an energy storage system 850 that includes the features of other energy storage systems (e.g., storage system 250) described herein. In some embodiments, electrical system 800 can include a backup PV system 860 that includes the features of other backup PV systems (e.g., backup PV system 260) described herein.

In some embodiments, a method (e.g., method 300) for integrating energy control system 100 with electrical system 800 includes setting the energy control system 100 in a partial home backup configuration. In some embodiments, the method for integrating energy control system 100 with electrical system 800 includes locating energy control system 100 downstream from main service panel 802 and upstream of subpanel 810. In some embodiments, main circuit breaker 806 remains in the main service panel 802, not within the housing of energy control system 100. In some embodiments, the method for integrating energy control system 100 with electrical system 800 includes removing the electrical loads 870 from main service panel 802 and connecting the electrical loads 870 to energy control system 100. In some embodiments, backup power bus 112 is connected to any of the small electrical loads 872 migrated from main service panel 802 via backup load interconnections 172. In some embodiments, a subpanel circuit breaker 811 can be located anywhere along the supply side, such as, for example, along backup load interconnection 172 or in subpanel 810. In some embodiments, the non-backup power bus 110 is connected to any of the large electrical loads 874 migrated from main service panel 802 via backup load interconnections 172. In some embodiments, the method for integrating energy control system 100 with electrical system 800 includes connecting energy storage system 850 to backup power bus 112 via storage interconnection 150. In some embodiments, the method for integrating energy control system 100 with electrical system 800 includes connecting backup PV system 860 to backup PV interconnection 160. In some embodiments, the method for integrating energy control system 100 with electrical system 800 includes locating site CT 132 within the housing of energy control system 100 if all the electrical loads 870 are connected to energy control system 100. In some embodiments, the method for integrating energy control system 100 with electrical system 800 includes locating site CT 132 upstream of energy control system 100 and outside the housing of energy control system 100 if one or more electrical loads 870 remain connected to main service panel 802.

Figure 9:
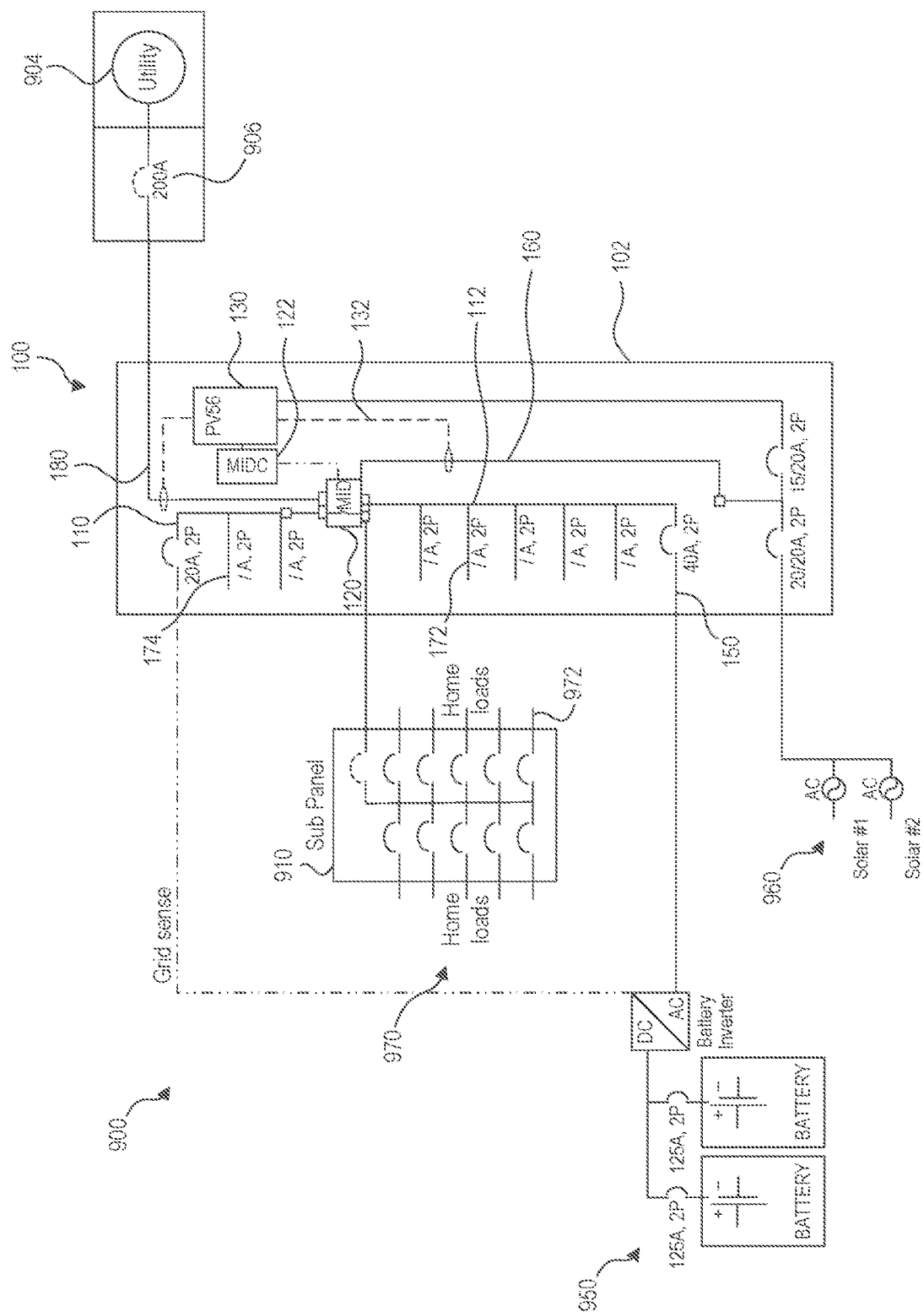
FIG. 9 illustrates an electrical system according to an embodiment.

FIG. 9 shows an electrical system 900, in which an existing subpanel feeder (e.g., subpanel 910) is disposed downstream of energy control system 100 set in a whole backup configuration. As shown in FIG. 9, in some embodiments, electrical system 900 can include a utility meter 904 without having a main service panel connected to utility meter 904. In some embodiments, electrical system can include a main circuit breaker 906 located proximate to utility meter 904, where utility meter 904 and main circuit breaker 906 are located outside of a home. In some embodiments, electrical system 900 can include a downstream subpanel 910 connected to a plurality of small electrical loads 972 having a breaker size of 40 A or less (e.g., lighting, router, television). In some embodiments, electrical system 900 can include an energy storage system 950 that includes the features of other energy storage systems (e.g., storage system 250) described herein. In some embodiments, electrical system 900 can include a backup PV system 960 that includes the features of other backup PV systems (e.g., backup PV system 260) described herein.

In some embodiments, a method (e.g., method 300) for integrating energy control system 100 with electrical system 900 includes setting the energy control system 100 in a whole home backup configuration. In some embodiments, the method for integrating energy control system 100 with electrical system 900 includes locating energy control system 100 downstream from utility meter 904 and upstream of subpanel 910. In some embodiments, the method (e.g., method 300) for integrating energy control system 100 with electrical system 900 includes connecting subpanel 910 to the load side of microgrid interconnection device 120, whereby the backup power bus 112 is not connected to any of the electrical loads 970. In some embodiments, the method for integrating energy control system 100 with electrical system 900 includes connecting energy storage system 950 to backup power bus 112 via storage interconnection 150. In some embodiments, the method for integrat-ing energy control system 100 with electrical system 900 includes connecting backup PV system 960 to backup PV interconnection 160.

Figure 10:
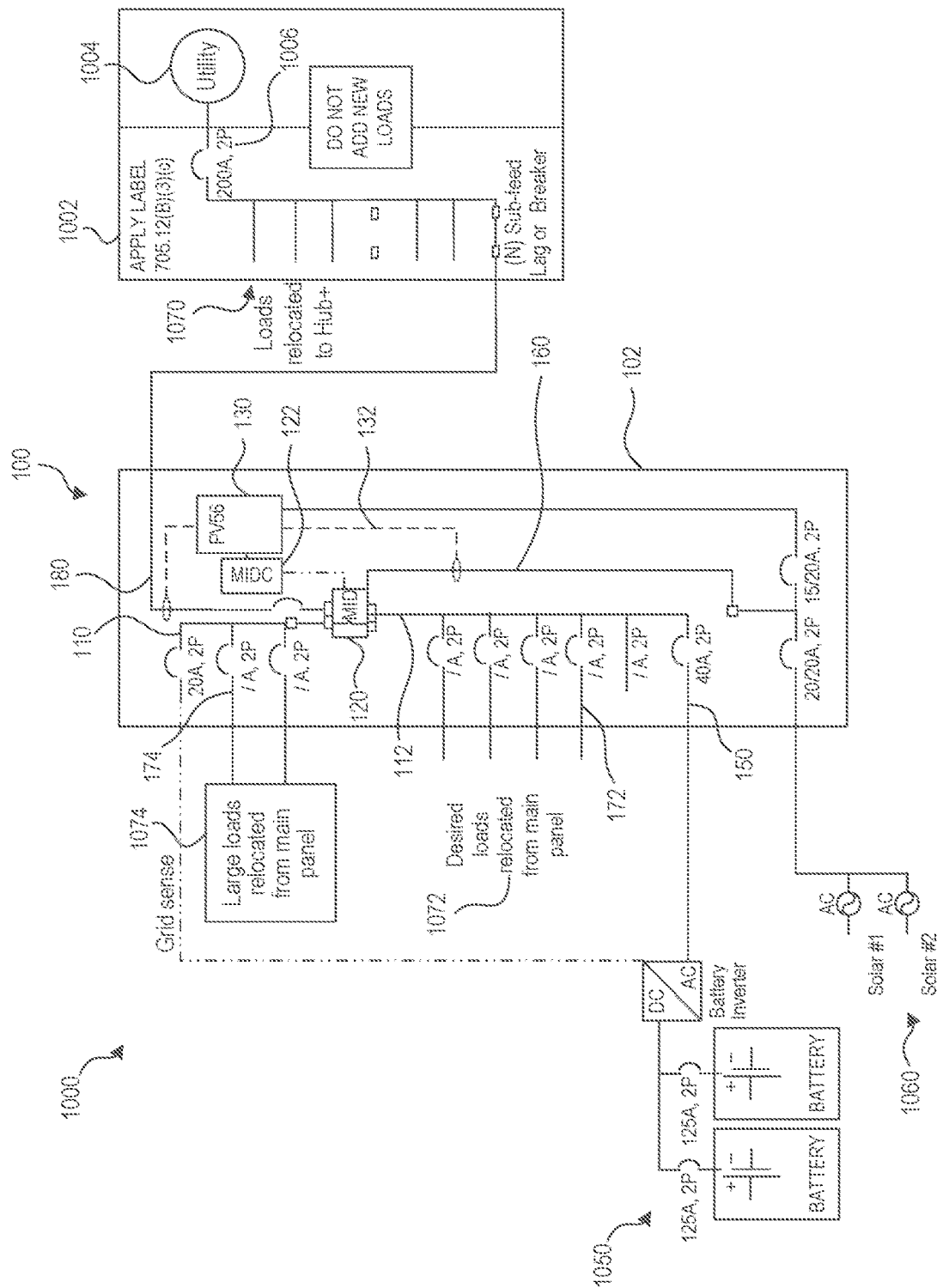
FIG. 10 illustrates an electrical system according to an embodiment.

FIG. 10 shows an electrical system 1000, in which a large load (e.g., load breaker size greater than 40 A) is migrated to non-backup power bus 110 of energy control system 100 set in a partial backup configuration. As shown in FIG. 10, in some embodiments, electrical system 1000 can include a main service panel 1002 integrated with a utility meter 1004. In some embodiments, main service panel 1002 can include a main circuit breaker 1006. In some embodiments, main service panel 1002 can be connected to a plurality of electrical loads 1070. In some embodiments, the plurality of electrical loads 1070 can include small electrical loads 1072 having a breaker size of 40 A or less (e.g., lighting, router, television) and large electrical loads 1074 having a breaker size greater than 40 A (e.g., air conditioner system, oven). In some embodiments, electrical system 1000 can include an energy storage system 1050 that includes the features of other energy storage systems (e.g., storage system 250) described herein. In some embodiments, electrical system 1000 can include a backup PV system 1060 that includes the features of other backup PV systems (e.g., backup PV system 260) described herein. In some embodiments, electrical system 1000 does not include any subpanels.

In some embodiments, a method (e.g., method 300) for integrating energy control system 100 with electrical system 1000 includes setting the energy control system 100 in a partial home backup configuration. In some embodiments, the method for integrating energy control system 100 with electrical system 1000 includes locating energy control system 100 downstream from main service panel 1002, where the main circuit breaker 1006 remains in the main service panel 1002, not within the housing of energy control system 100. In some embodiments, the method for integrating energy control system 100 with electrical system 1000 includes migrating the plurality of electrical loads 1070 to energy control system 100 by connecting small electrical loads 1072 to the backup power bus 112 via one or more backup load interconnections 172 and large electrical loads 1074 to the non-backup power bus 110 via non-backup load interconnections 174. In some embodiments, the method for integrating energy control system 100 with electrical system 1000 includes connecting energy storage system 1050 to backup power bus 112 via storage interconnection 150. In some embodiments, the method for integrating energy control system 100 with electrical system 1000 includes connecting backup PV system 1060 to backup PV interconnection 160. In some embodiments, the method for integrating energy control system 100 with electrical system 1000 includes locating site CT 132 within the housing of energy control system 100 if all the electrical loads 1070 are connected to energy control system 100. In some embodiments, the method for integrating energy control system 100 with electrical system 1000 includes locating site CT 132 upstream of energy control system 100 and outside the housing of energy control system 100 if one or more electrical loads 1070 remain connected to main service panel 1002.

Figure 11:
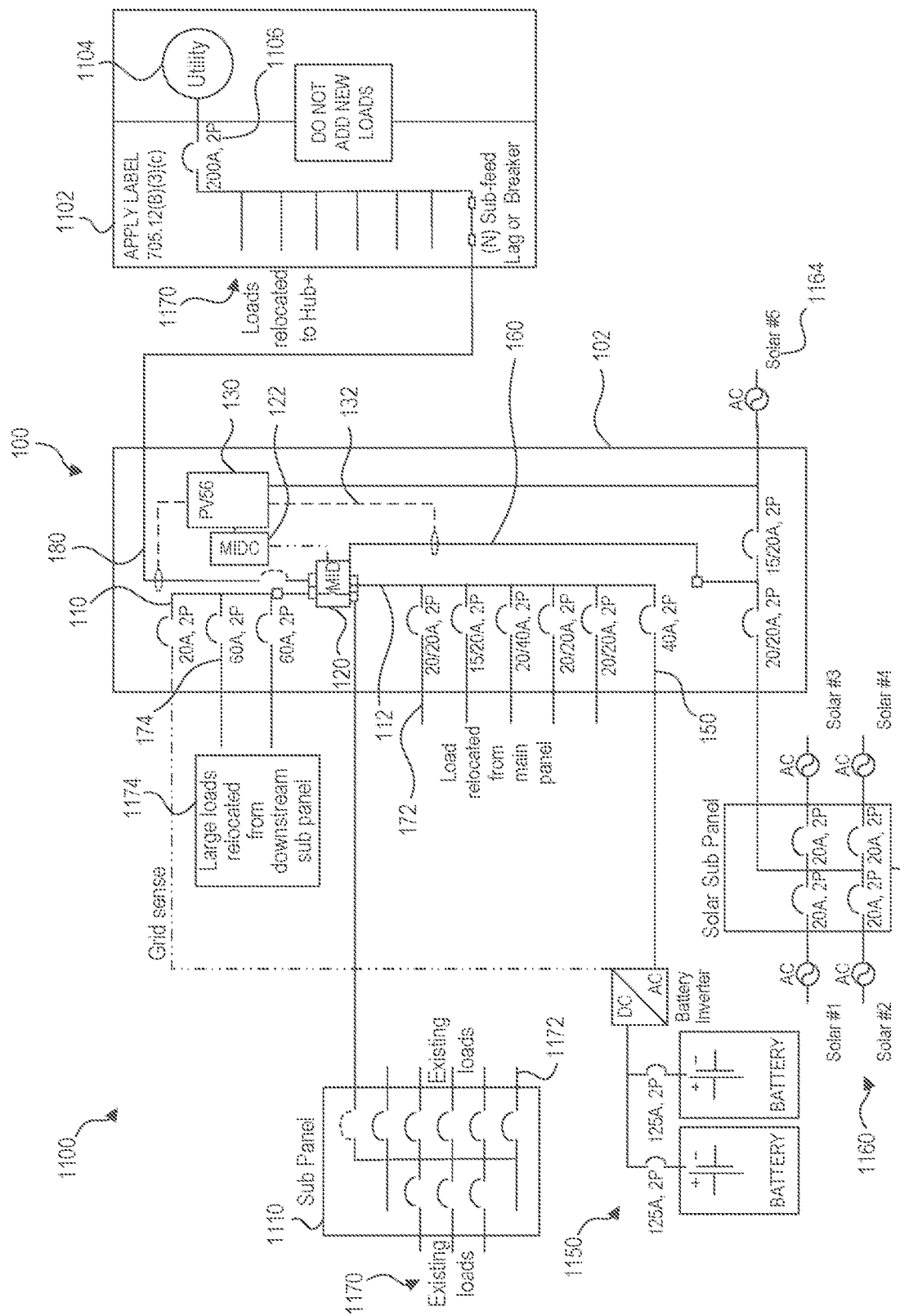
FIG. 11 illustrates an electrical system according to an embodiment.

FIG. 11 shows an electrical system 1100, in which a PV subpanel (e.g., PV subpanel 1162) and an auxiliary PV power generation array (e.g., auxiliary power generation array 1164) are connected to backup PV interconnection 160 of energy control system 100 using a PV combiner. As shown in FIG. 11, in some embodiments, electrical system 1100 can include a main service panel 1102 integrated with a utility meter 1104. In some embodiments, main service panel 1102 can include a main circuit breaker 1106. In some embodiments, main service panel 1102 can be connected to one or more electrical loads 1170. In some embodiments, electrical system 1100 can include a subpanel 1110 located downstream of main service panel 1102 connected to a plurality of electrical loads 1170. In some embodiments, the plurality of electrical loads 1170 can include small electrical loads 1172 having a breaker size of 40 A or less (e.g., lighting, router, television) and large electrical loads 1174 having a breaker size greater than 40 A (e.g., air conditioner system, oven). In some embodiments, electrical system 1100 can include an energy storage system 1150 that includes the features of other energy storage systems (e.g., storage system 250) described herein. In some embodiments, electrical system 1100 can include a backup PV system 1160 that includes a PV subpanel 1162 connected to a plurality of power generation arrays (e.g., four power generation arrays) and a circuit breaker (e.g., 200 A circuit breaker) associated with each power array. In some embodiments, backup PV system 1160 can include an auxiliary power generation array 1164.

In some embodiments, a method (e.g., method 300) for integrating energy control system 100 with electrical system 1100 includes setting the energy control system 100 in a partial home backup configuration. In some embodiments, the method for integrating energy control system 100 with electrical system 1100 includes locating energy control system 100 downstream from main service panel 1102 and upstream of subpanel 1110 and PV subpanel 1162. In some embodiments, main circuit breaker 1106 remains in the main service panel 1102, not within the housing of energy control system 100. In some embodiments, the method for integrating energy control system 100 with electrical system 1100 includes removing the electrical loads 1170 from main service panel 1102 and connecting the electrical loads 1170 to energy control system 100. In some embodiments, the backup power bus 112 is connected to any of the small electrical loads 1172 migrated from main service panel 1102 via backup load interconnections 172. In some embodiments, the non-backup power bus 110 is connected to any of the large electrical loads 1174 migrated from main service panel 1102 via non-backup load interconnections 174. In some embodiments, the method for integrating energy control system 100 with electrical system 1100 can include connecting subpanel 1110 to the load side of microgrid interconnection device 120. In some embodiments, the method for integrating energy control system 100 with electrical system 1100 includes removing large electrical loads 1174 from subpanel 1110 and connecting large electrical loads 1174 to non-backup power bus 110 via non-backup load interconnection 174. In some embodiments, the method for integrating energy control system 100 with electrical system 1100 includes connecting energy storage system 1150 to backup power bus 112 via storage interconnection 150.

In some embodiments, the method for integrating energy control system 100 with electrical system 1100 includes connecting PV subpanel 1162 and auxiliary power generation array 1164 to backup PV interconnection 160. In some embodiments, the method for integrating energy control system 100 with electrical system 1100 includes locating site CT 132 within the housing of energy control system 100 if all the electrical loads 1170 are connected to energy control system 100. In some embodiments, the method for integrating energy control system 100 with electrical system 1100 includes locating site CT 132 upstream of energy control system 100 and outside the housing of energy control system 100 if one or more electrical loads 1170 remain connected to main service panel 1102.

Figure 12:
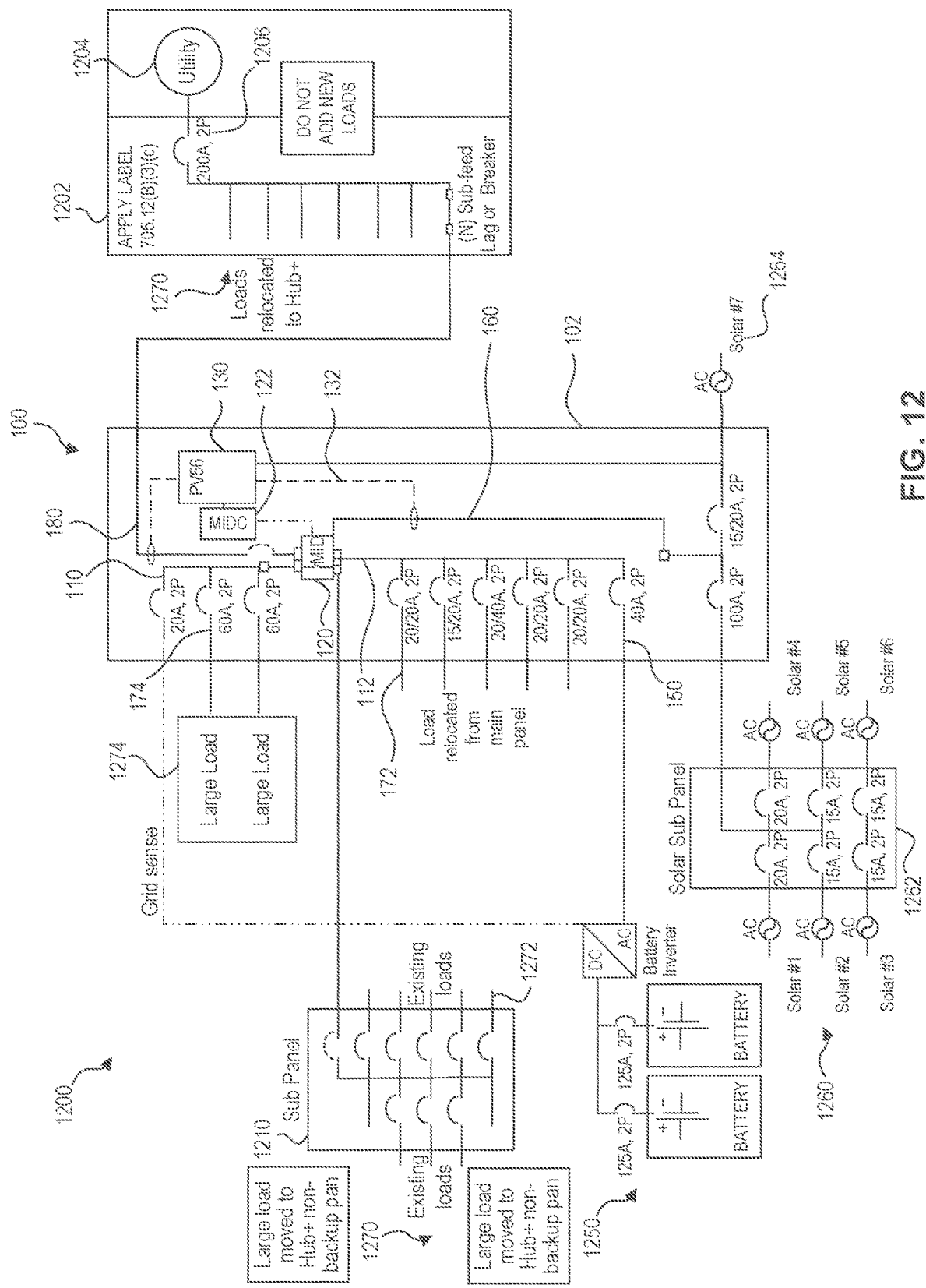
FIG. 12 illustrates an electrical system according to an embodiment.

FIG. 12 shows an electrical system 1200, in which energy control system 100 is integrated with a backup PV system (e.g., backup PV system 1260) that feeds maximum PV output to backup PV interconnection 160. As shown in FIG. 12, in some embodiments, electrical system 1200 can include a main service panel 1202 integrated with a utility meter 1204. In some embodiments, main service panel 1202 can include a main circuit breaker 1206. In some embodiments, main service panel 1202 can be connected to one or more electrical loads 1270. In some embodiments, electrical system 1200 can include a subpanel 1210 located downstream of main service panel 1202 connected to a plurality of electrical loads 1270. In some embodiments, the plurality of electrical loads 1270 can include small electrical loads 1272 having a breaker size of 40 A or less (e.g., lighting, router, television) and large electrical loads 1274 having a breaker size greater than 40 A (e.g., air conditioner system, oven). In some embodiments, electrical system 1200 can include an energy storage system 1250 that includes the features of other energy storage systems (e.g., storage system 250) described herein. In some embodiments, electrical system 1200 can include a backup PV system 1260 that includes a PV subpanel 1262 connected to a plurality of power generation arrays (e.g., six power generation arrays) and a circuit breaker (e.g., 4×15 A double pole breakers and 2×20 A double pole breakers) associated with each power array. In some embodiments, backup PV system 1260 system includes an auxiliary power generation array 1264 not connected to PV subpanel 1262 and having a double pole circuit breaker. In some embodiments, backup PV system 1260 is configured to output 120 A of PV power supply.

In some embodiments, a method (e.g., method 300) for integrating energy control system 100 with electrical system 1200 includes setting the energy control system 100 in a partial home backup configuration. In some embodiments, the method for integrating energy control system 100 with electrical system 1200 includes locating energy control system 100 downstream from main service panel 1202 and upstream of subpanel 1210 and PV subpanel 1262. In some embodiments, main circuit breaker 1206 remains in the main service panel 1202, not within the housing of energy control system 100. In some embodiments, the method (e.g., method 300) for integrating energy control system 100 with electrical system 1200 includes removing the electrical loads 1270 from main service panel 1202 and connecting the electrical loads 1270 to energy control system 100. In some embodiments, the method for integrating energy control system 100 with electrical system 1200 can include connecting subpanel 1210 to the load side of microgrid interconnection device 120. In some embodiments, the backup power bus 112 is connected to any of the small electrical loads 1272 migrated from main service panel 1202 via backup load interconnections 172. In some embodiments, the method for integrating energy control system 100 with electrical system 1200 includes removing large electrical loads 1274 from subpanel 1210 and connecting large electrical loads 1274 to non-backup power bus 110 via non-backup load interconnection 174. In some embodiments, the method for integrating energy control system 100 with electrical system 1200 includes connecting energy storage system 1250 to backup power bus 112 via storage interconnection 150.

In some embodiments, the method for integrating energy control system 100 with electrical system 1200 includes connecting both PV subpanel 1262 and auxiliary power generation array 1264 to backup PV interconnection 160. In some embodiments, the method for integrating energy control system 100 with electrical system 1200 includes locating site CT 132 within the housing of energy control system 100 if all the electrical loads 1270 are connected to energy control system 100. In some embodiments, the method for integrating energy control system 100 with electrical system 1200 includes locating site CT 132 upstream of energy control system 100 and outside the housing of energy control system 100 if one or more electrical loads 1270 remain connected to main service panel 1202.

Figure 13:
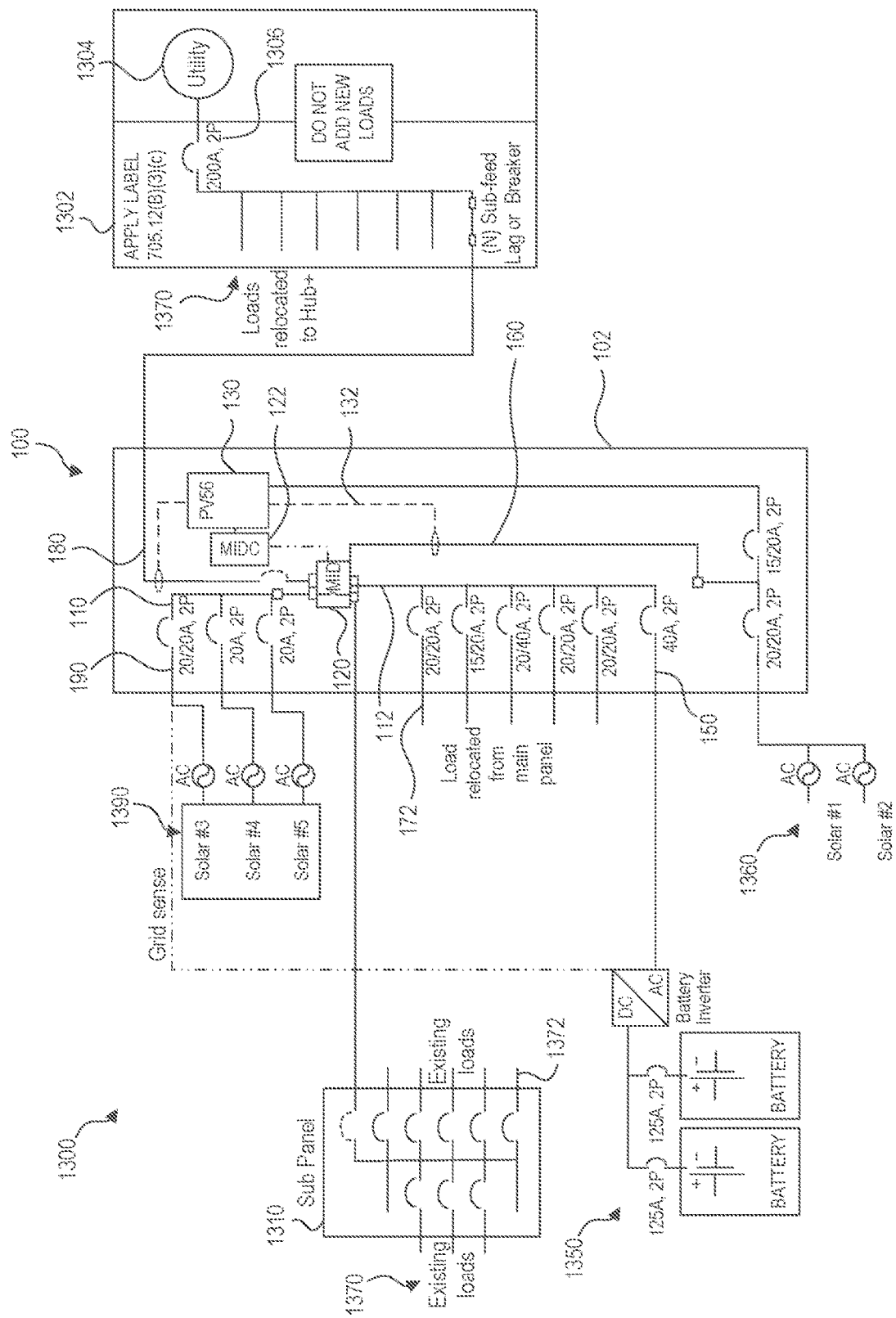
FIG. 13 illustrates an electrical system according to an embodiment.

FIG. 13 shows an electrical system 1300, in which energy control system 100 is integrated with split PV production—a backup PV system (e.g., backup PV system 1360) and a non-backup PV system (e.g., non-backup PV system 1390). As shown in FIG. 13, in some embodiments, electrical system 1300 can include a main service panel 1302 integrated with a utility meter 1304. In some embodiments, main service panel 1302 can include a main circuit breaker 1306. In some embodiments, main service panel 1302 can be connected to one or more electrical loads 1370. In some embodiments, electrical system 1300 can include a subpanel 1310 located downstream of main service panel 1302 connected to a plurality of electrical loads 1370. In some embodiments, the plurality of electrical loads 1370 can include all small electrical loads 1372 having a breaker size of 40 A or less (e.g., lighting, router, television). In some embodiments, electrical system 1300 can include an energy storage system 1350 that includes the features of other energy storage systems (e.g., storage system 250) described herein. In some embodiments, electrical system 1300 can include a backup PV system 1360 and a non-backup PV system 1390.

In some embodiments, a method (e.g., method 300) for integrating energy control system 100 with electrical system 1300 includes setting the energy control system 100 in a partial home backup configuration or a whole home backup configuration. In some embodiments, the method for integrating energy control system 100 with electrical system 1300 includes locating energy control system 100 downstream from main service panel 1302 and upstream of subpanel 1310. In some embodiments, main circuit breaker 1306 remains in the main service panel 1302, not within the housing of energy control system 100. In some embodiments, the method for integrating energy control system 100 with electrical system 1300 includes removing the electrical loads 1370 from main service panel 1302 and connecting the electrical loads 1370 to energy control system 100. In some embodiments, the method for integrating energy control system 100 with electrical system 1300 can include connecting subpanel 1310 to the load side of microgrid interconnection device 120. In some embodiments, the backup power bus 112 is connected to any of the small electrical loads 1372 migrated from main service panel 1302 via backup load interconnections 172. In some embodiments, the method for integrating energy control system 100 with electrical system 1300 includes connecting energy storage system 1350 to backup power bus 112 via storage interconnection 150.

In some embodiments, the method for integrating energy control system 100 with electrical system 1300 includes connecting backup PV system 1360 to backup PV interconnection 160 and connecting non-backup PV system 1390 to non-backup power bus 110 via non-backup PV interconnection 190. In some embodiments, the method for integrating energy control system 100 with electrical system 1300 includes locating site CT 132 within the housing of energy control system 100 if all the electrical loads 1370 are connected to energy control system 100. In some embodiments, the method for integrating energy control system 100 with electrical system 1300 includes locating site CT 132 upstream of energy control system 100 and outside the housing of energy control system 100 if one or more electrical loads 1370 remain connected to main service panel 1302.

In some embodiments, PV monitoring system 130 can be configured to monitor both the backup PV system 1360 and non-backup PV system 1390 when microgrid interconnection device 120 is set in on-grid mode. In some embodiments, PV monitoring system 130 can be configured to monitor backup PV system 1360, while setting the output of non-backup PV system 1390 to zero, when microgrid interconnection device 120 is set in backup mode.

Figure 14:
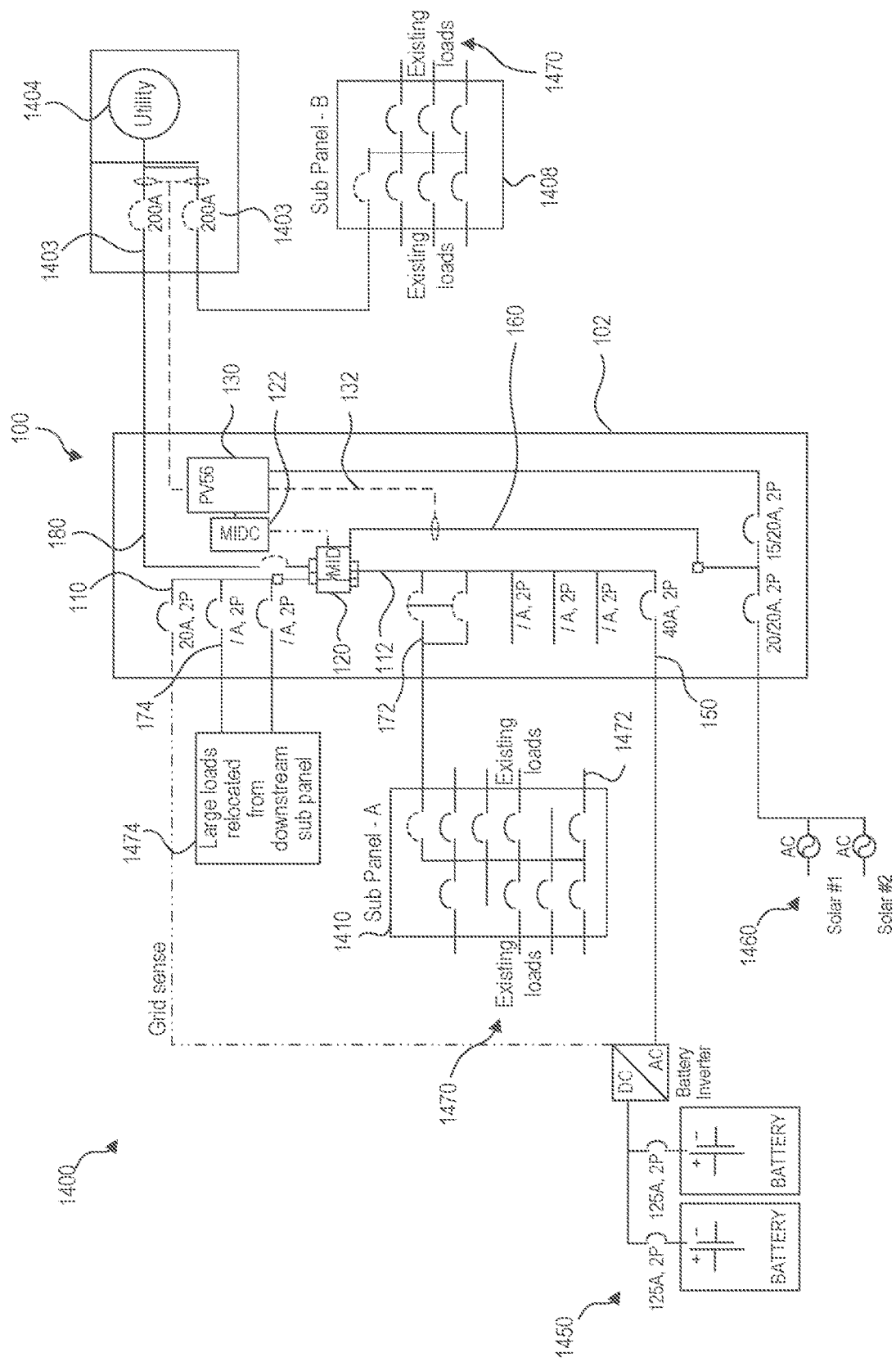
FIG. 14 illustrates an electrical system according to an embodiment.

FIG. 14 shows an electrical system 1400, in which energy control system 100 is configured to site monitor a larger utility service size (e.g., 400 A with two 200 A feeders). As shown in FIG. 14, in some embodiments, electrical system 1400 can include a meter panel 1402 having a utility meter 1404. In some embodiments, meter panel 1402 can be supplied 400 A (i.e., a utility service size) from a utility grid, in which the supply is split into two 200 A feeders 1403A, 1403B. In some embodiments, electrical system 1400 can include an upstream subpanel 1408 electrically coupled to one of the two 200 A feeders 1403A. In some embodiments, upstream subpanel 1408 can be electrically coupled to a plurality of electrical loads 1470. In some embodiments, electrical system 1400 can include a downstream subpanel 1410 connected to the plurality of electrical loads 1470. In some embodiments, the plurality of electrical loads 1470 can include small electrical loads 1472 having a breaker size of 40 A or less (e.g., lighting, router, television) and large electrical loads 1474 having a breaker size greater than 40 A (e.g., air conditioner system, oven). In some embodiments, electrical system 1400 can include an energy storage system 1450 that includes the features of other energy storage systems (e.g., storage system 250) described herein. In some embodiments, electrical system 1400 can include a backup PV system 1460 that includes the features of other backup PV systems (e.g., backup PV system 260) described herein.

In some embodiments, a method (e.g., method 300) for integrating energy control system 100 with electrical system 1400 includes setting the energy control system 100 in a partial home backup configuration. In some embodiments, the method for integrating energy control system 100 with electrical system 1400 includes locating energy control system 100 downstream from meter panel 1402 and subpanel 1408 and upstream of subpanel 1410. In some embodiments, the method for integrating energy control system 100 with electrical system 1400 includes connecting the other one of the feeders 1403B to energy control system 100 via grid interconnection 180. In some embodiments, the method for integrating energy control system 100 with electrical system 1400 includes locating site CT at meter panel 1402.

In some embodiments, the method for integrating energy control system 100 with electrical system 1400 includes connecting subpanel 1410 to backup power bus 112 via backup load interconnection 172. In some embodiments, the method for integrating energy control system 100 with electrical system 1400 includes removing large electrical loads 1474 from subpanel 1410 and connecting large electrical loads 1474 to non-backup power bus 110 via non-backup load interconnection 174. In some embodiments, the method for integrating energy control system 100 with electrical system 1400 includes connecting energy storage system 1450 to backup power bus 112 via storage interconnection 150. In some embodiments, the method for integrating energy control system 100 with electrical system 1400 includes connecting backup PV system 1460 to backup PV interconnection 160.

Figure 15:
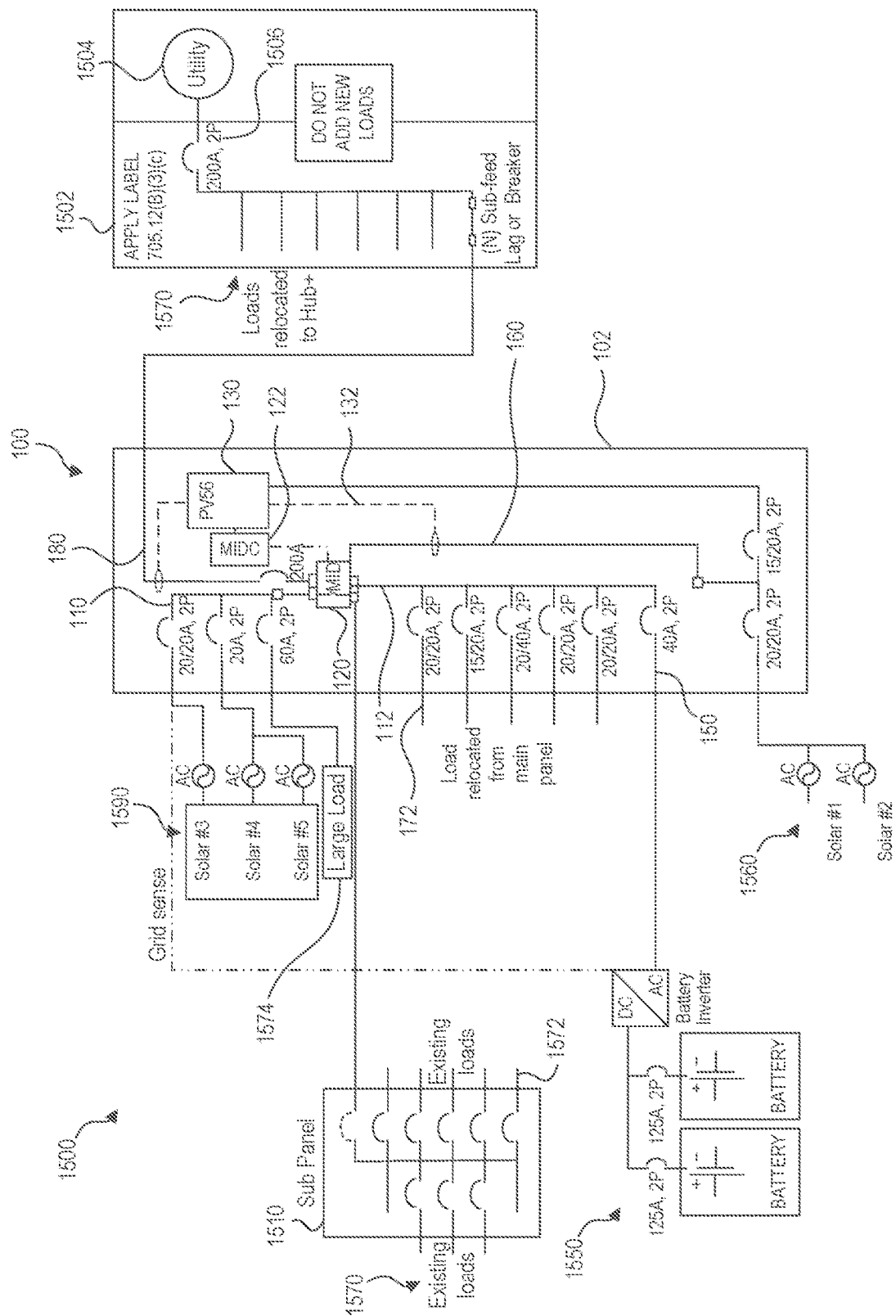
FIG. 15 illustrates an electrical system according to an embodiment.

FIG. 15 shows an electrical system 1500, in which energy control system 100 is configured to navigate the 120% rule (e.g., NEC 705.12(D)(2)) with split PV production generating up to 20 kW. As shown in FIG. 15, in some embodiments, electrical system 1500 can include a main service panel 1502 integrated with a utility meter 1504. In some embodiments, main service panel 1502 can include a main circuit breaker 1506. In some embodiments, main service panel 1502 can be connected to one or more electrical loads 1570. In some embodiments, electrical system 1500 can include a subpanel 1510 located downstream of main service panel 1502 connected to a plurality of electrical loads 1570. In some embodiments, the plurality of electrical loads 1570 can include small electrical loads 1572 having a breaker size of 40 A or less (e.g., lighting, router, television) and large electrical loads 1574 having a breaker size greater than 40 A (e.g., air conditioner system, oven). In some embodiments, electrical system 1500 can include an energy storage system 1550 that includes the features of other energy storage systems (e.g., storage system 250) described herein. In some embodiments, electrical system 1500 can include a backup PV system 1560 (e.g., 7.5 kW AC PV system, two strings of 13 solar panels) and a non-backup PV system 1590 (e.g., 12.5 kW AC PV system, three strings of 11 solar panels).

In some embodiments, a method (e.g., method 300) for integrating energy control system 100 with electrical system 1500 includes setting the energy control system 100 in a partial home backup configuration. In some embodiments, the method for integrating energy control system 100 with electrical system 1500 includes locating energy control system 100 downstream from main service panel 1502 and upstream of subpanel 1510. In some embodiments, main circuit breaker 1506 remains in the main service panel 1502, not within the housing of energy control system 100. In some embodiments, the method for integrating energy control system 100 with electrical system 1500 includes removing the electrical loads 1570 from main service panel 1502 and connecting the electrical loads 1570 to energy control system 100. In some embodiments, the backup power bus 112 is connected to any of the small electrical loads 1572 migrated from main service panel 1502 via backup load interconnections 172. In some embodiments, the non-backup power bus 110 is connected to any of the large electrical loads 1574 migrated from main service panel 1502 via non-backup load interconnections 174. In some embodiments, the method for integrating energy control system 100 with electrical system 1500 can include connecting subpanel 1510 to the load side of microgrid interconnection device 120. In some embodiments, the method for integrating energy control system 100 with electrical system 1500 includes removing large electrical loads 1574 from subpanel 1510 and connecting large electrical loads 1574 to non-backup power bus 110 via non-backup load interconnection 174. In some embodiments, the method for integrating energy control system 100 with electrical system 1500 includes connecting energy storage system 1550 to backup power bus 112 via storage interconnection 150.

In some embodiments, the method for integrating energy control system 100 with electrical system 1300 includes connecting backup PV system 1560 to backup PV interconnection 160 and connecting non-backup PV system 1590 to non-backup power bus 110. In some embodiments, the method for integrating energy control system 100 with electrical system 1500 includes locating site CT 132 within the housing of energy control system 100 if all the electrical loads 1570 are connected to energy control system 100. In some embodiments, the method for integrating energy control system 100 with electrical system 1500 includes locating site CT 132 upstream of energy control system 100 and outside the housing of energy control system 100 if one or more electrical loads 1570 remain connected to main service panel 1502.

In some embodiments, electrical system 1500 can be supplied 200 A (i.e., utility service size) at the main service panel 1502 and backup PV system 1560 can be configured to generate and supply 20 kW or 80 A to 100 A of power to energy control system 100. To comply with safety standards (e.g., NEC 705.12(D)(2)), all of the electrical loads 1570 migrated from the main service panel 1502 to energy control system 100 are located downstream of backup PV interconnection 160, and the sum of the all non-backup loads, including output from non-backup PV system 1690, is set to not exceed 125 A. The sum of all load side ampere ratings does not exceed the ampacity rating of a bus bar located in microgrid interconnection device 120.

Figure 16:
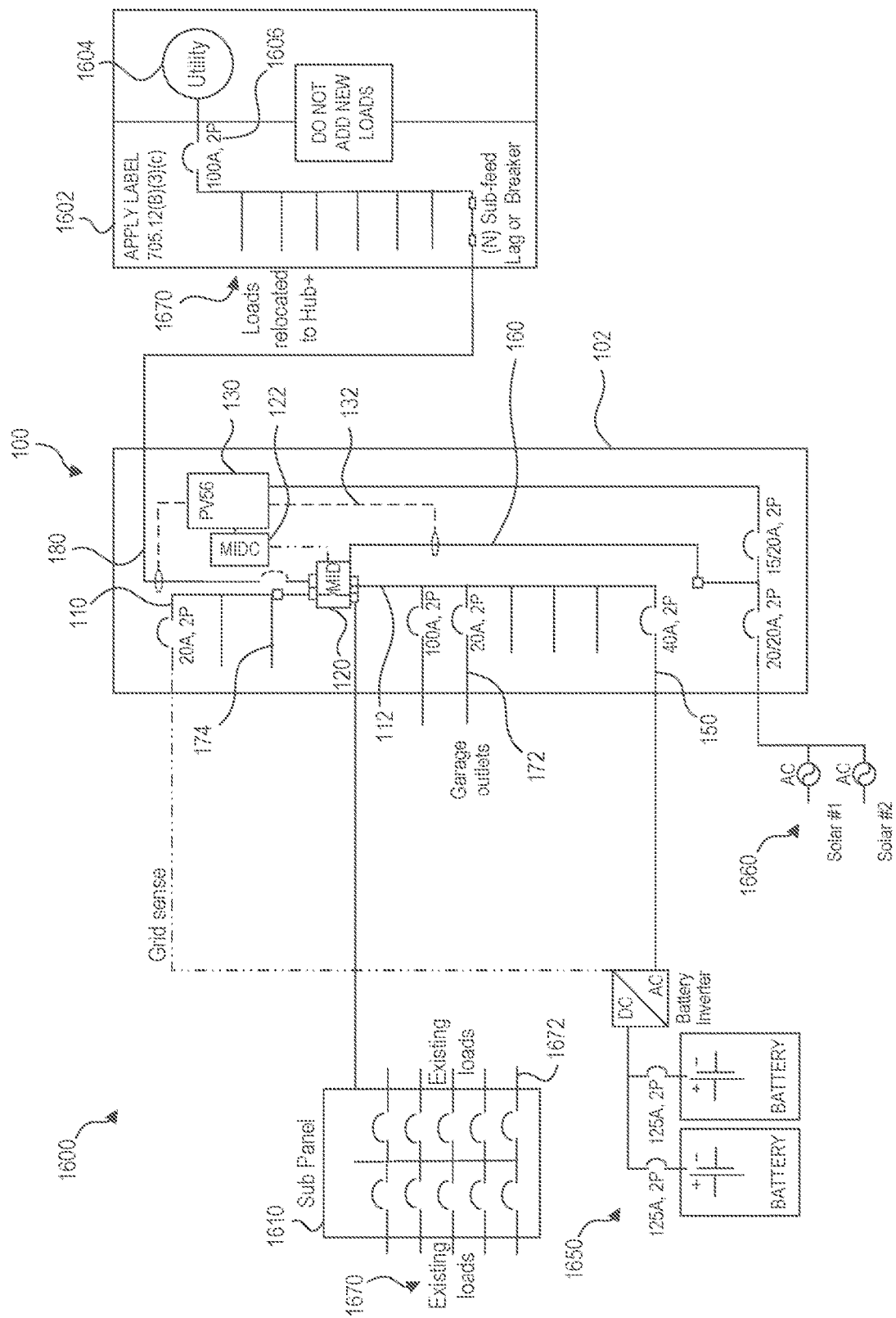
FIG. 16 illustrates an electrical system according to an embodiment.

FIG. 16 shows an electrical system 1600, in which energy control system 100 is integrated with a 100 A rating main service panel and 7.5 kW PV system (e.g., backup PV system 1660). As shown in FIG. 16, in some embodiments, electrical system 1600 can include a main service panel 1602 integrated with a utility meter 1604. In some embodiments, main service panel 1602 is supplied 100 A (i.e., utility service size) from the utility grid. In some embodiments, main service panel 1602 can include a main circuit breaker 1606. In some embodiments, main service panel 1602 can be connected to one or more electrical loads 1670. In some embodiments, electrical system 1600 can include a subpanel 1610 located downstream of main service panel 1602 connected to a plurality of electrical loads 1670. In some embodiments, the plurality of electrical loads 1670 can include all small electrical loads 1672 having a breaker size of 40 A or less (e.g., lighting, router, television). In some embodiments, electrical system 1600 can include an energy storage system 1650 that includes the features of other energy storage systems (e.g., storage system 250) described herein. In some embodiments, electrical system 1600 can include a backup PV system 1660 (e.g., 7.5 kW AC PV system with 2 strings of 12 solar panels) that includes the features of other backup PV systems (e.g., backup PV system 260) described herein.

In some embodiments, a method (e.g., method 300) for integrating energy control system 100 with electrical system 1600 includes setting the energy control system 100 in a partial home backup configuration. In some embodiments, the method for integrating energy control system 100 with electrical system 1600 includes locating energy control system 100 downstream from main service panel 1602 and upstream of subpanel 1610. In some embodiments, main circuit breaker 1606 remains in the main service panel 1602, not within the housing of energy control system 100. In some embodiments, the method for integrating energy control system 100 with electrical system 1600 includes removing the electrical loads 1670 from main service panel 1602 and connecting the electrical loads 1670 to energy control system 100. In some embodiments, the backup power bus 112 is connected to any of the small electrical loads 1672 migrated from main service panel 1602 via backup load interconnections 172.

In some embodiments, the method for integrating energy control system 100 with electrical system 1600 includes connecting energy storage system 1650 to backup power bus 112 via storage interconnection 150. In some embodiments, the method for integrating energy control system 100 with electrical system 1600 includes connecting backup PV system 1660 to backup PV interconnection 160. In some embodiments, the method for integrating energy control system 100 with electrical system 1600 includes locating site CT 132 within the housing of energy control system 100 if all the electrical loads 1670 are connected to energy control system 100. In some embodiments, the method for integrating energy control system 100 with electrical system 1600 includes locating site CT 132 upstream of energy control system 100 and outside the housing of energy control system 100 if one or more electrical loads 1670 remain connected to main service panel 1602.

In some embodiments, electrical system 1600 can be supplied 100 A (i.e., utility service size) at the main service panel 1602 and backup PV system 1660 can be configured to generate and supply 7.5 kW or 40 A of power to energy control system 100. To comply with safety standards (e.g., NEC 705.12(D)(2)), all of the electrical loads 1670 migrated from the main service panel 1602 to energy control system 100 are located downstream of backup PV interconnection 160, which is configured to support up to 125 A of power output. Due to the load migration, integration of energy control system 100 allows electrical system 1600 to avoid installing multiple main service panels to handle the 7.5 kW backup power supply.

Figure 17:
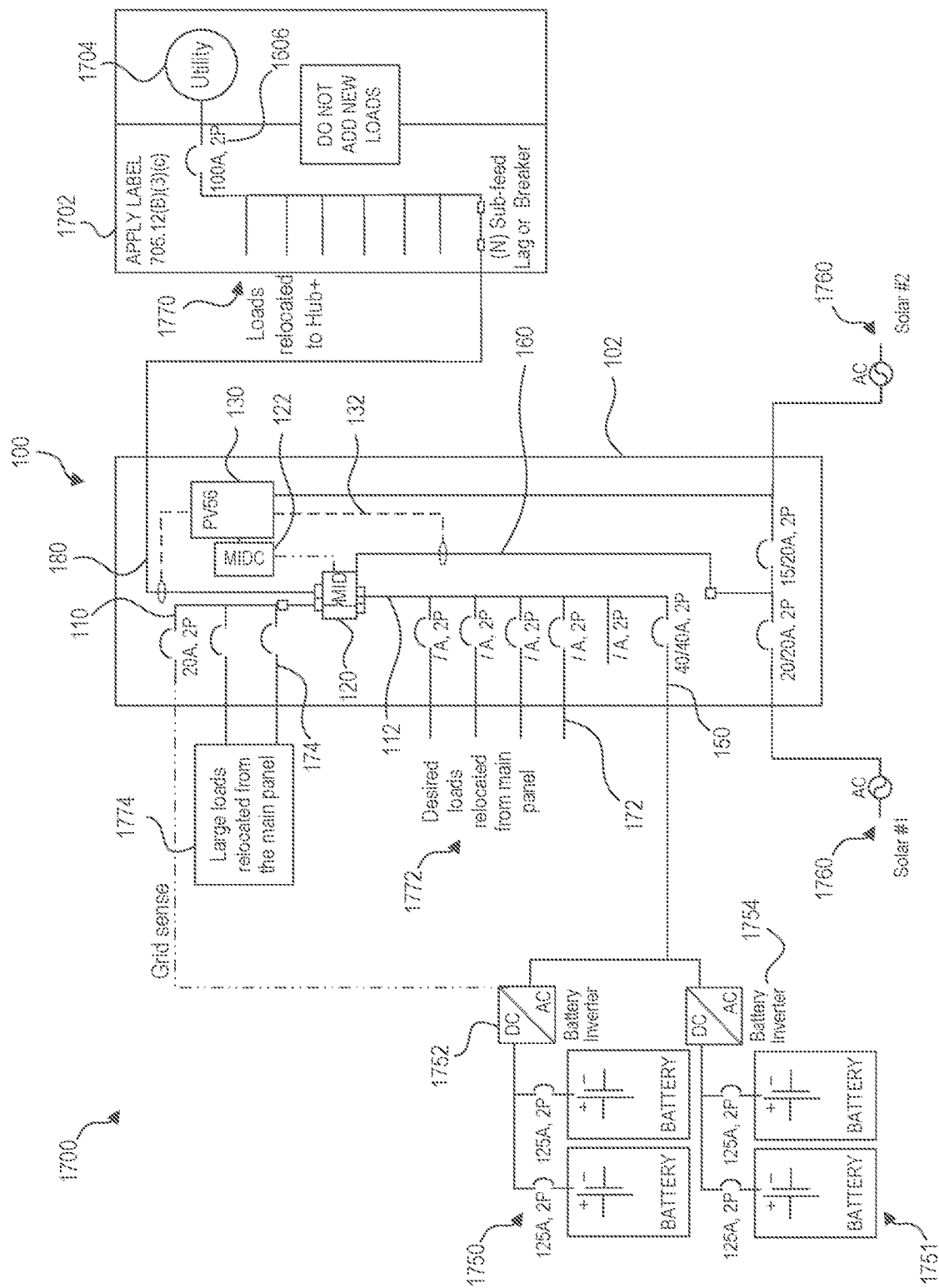
FIG. 17 illustrates an electrical system according to an embodiment.

FIG. 17 shows an electrical system 1700, in which energy control system 100 allows expansion of power supply from a higher capacity energy storage system (e.g., energy storage system 1750). As shown in FIG. 17, in some embodiments, electrical system 1700 can include a main service panel 1702 integrated with a utility meter 1704. In some embodiments, main service panel 1702 can include a main circuit breaker 1706. In some embodiments, main service panel 1702 can be connected to a plurality of electrical loads 1770. In some embodiments, the plurality of electrical loads 1770 can include small electrical loads 1772 having a breaker size of 40 A or less (e.g., lighting, router, television) and large electrical loads 1774 having a breaker size greater than 40 A (e.g., air conditioner system, oven). In some embodiments, electrical system 1700 can include a first energy storage system 1750 that includes a first storage inverter 1752 and a second energy storage system 1751 that includes a second storage inverter 1754. In some embodiments, first and second energy storage systems 1750, 1751 can include the features of other energy storage systems (e.g., storage system 250) described herein. In some embodiments, electrical system 1700 can include a backup PV system 1760 (e.g., 7.5 kW AC PV system with 2 strings of 12 solar panels) that includes the features of other backup PV systems (e.g., backup PV system 260) described herein. In some embodiments, electrical system 1700 does not include any subpanels.

In some embodiments, a method (e.g., method 300) for integrating energy control system 100 with electrical system 1700 includes setting the energy control system 100 in a partial home backup configuration or a whole home backup configuration. In some embodiments, the method for integrating energy control system 100 with electrical system 1700 includes locating energy control system 100 downstream from main service panel 1702, where the main circuit breaker 1706 remains in the main service panel 1702, not within the housing of energy control system 100. In some embodiments, the method for integrating energy control system 100 with electrical system 1700 includes removing the plurality of electrical loads 1770 from the main service panel 1702 and connecting the electrical loads 1770 to energy control system 100. In some embodiments, if set in whole home back up configuration, all electrical loads 1070 can be connected to the backup power bus 112 via one or more backup load interconnections 172. In some embodiments, if set in the partial backup configuration, large electrical loads 1774 can be connected to the non-backup power bus 110 via non-backup load interconnections 174. In some embodiments, the method for integrating energy control system 100 with electrical system 1000 includes connecting both first energy storage system 1750 and second energy storage system 1751 to backup power bus 112 via storage interconnection 150. In some embodiments, storage interconnection 150 can include a 40/40 quad breaker. In some embodiments, the method for integrating energy control system 100 with electrical system 1700 includes connecting backup PV system 1760 to backup PV interconnection 160. In some embodiments, the method for integrating energy control system 100 with electrical system 1700 includes locating site CT 132 within the housing of energy control system 100 if all the electrical loads 1770 are connected to energy control system 100. In some embodiments, the method for integrating energy control system 100 with electrical system 1700 includes locating site CT 132 upstream of energy control system 100 and outside the housing of energy control system 100 if one or more electrical loads 1770 remain connected to main service panel 1702.

Figure 18:
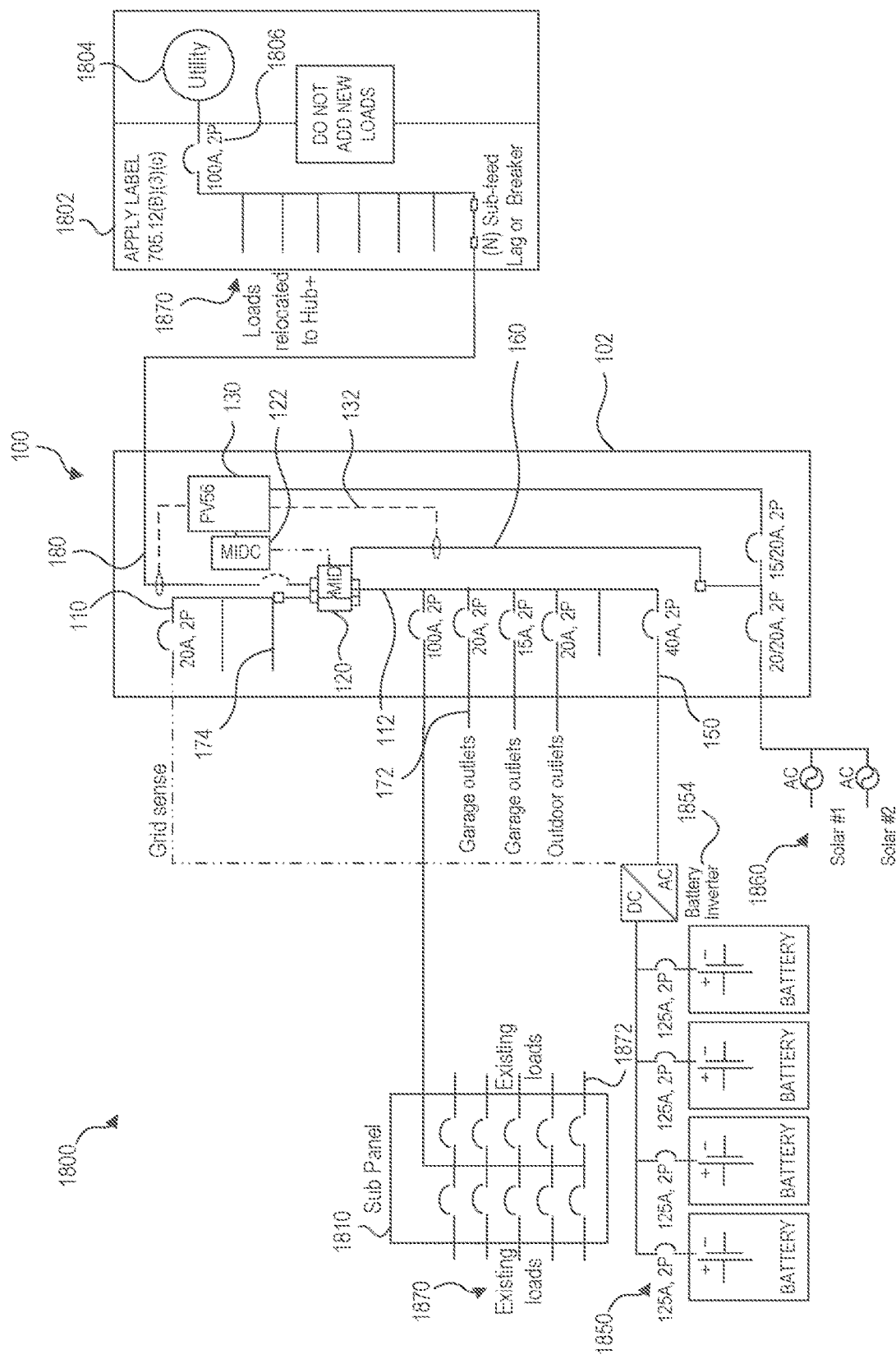
FIG. 18 illustrates an electrical system according to an embodiment.

FIG. 18 shows an electrical system 1800, in which energy control system 100 allows expansion of power supply from a 26 kW capacity energy storage system (e.g., energy storage system 1850). As shown in FIG. 18, in some embodiments, electrical system 1800 can include a main service panel 1802 integrated with a utility meter 1804. In some embodiments, main service panel 1802 can include a main circuit breaker 1806. In some embodiments, main service panel 1802 can be connected to one or more electrical loads 1870. In some embodiments, electrical system 1800 can include a subpanel 1810 located downstream of main service panel 1802 connected to a plurality of electrical loads 1870. In some embodiments, the plurality of electrical loads 1870 can include all small electrical loads 1872 having a breaker size of 40 A or less (e.g., lighting, router, television). In some embodiments, electrical system 1800 can include an energy storage system 1850 that includes a set of storage batteries 1852 (e.g., four batteries) having a total storage capacity of 26 kW. In some embodiments, storage batteries 1852 can be connected to a single storage inverter 1854. In some embodiments, energy storage system 1850 can include any of the features of other energy storage systems (e.g., storage system 250) described herein. In some embodiments, electrical system 1800 can include a backup PV system 1860 (e.g., 7.5 kW AC PV system with 2 strings of 12 solar panels) that includes any of the features of other backup PV systems (e.g., backup PV system 260) described herein.

In some embodiments, a method (e.g., method 300) for integrating energy control system 100 with electrical system 1800 includes setting the energy control system 100 in a whole home backup configuration. In some embodiments, the method for integrating energy control system 100 with electrical system 1800 includes locating energy control system 100 downstream from main service panel 1802 and upstream of subpanel 1810. In some embodiments, main circuit breaker 1806 remains in the main service panel 1802, not within the housing of energy control system 100. In some embodiments, the method for integrating energy control system 100 with electrical system 1800 includes removing the electrical loads 1870 from main service panel 1802 and connecting the electrical loads 1870 to backup power bus 112 of energy control system 100

In some embodiments, the method for integrating energy control system 100 with electrical system 1800 includes connecting energy storage system 1850 to backup power bus 112 via storage interconnection 150. In some embodiments, the method for integrating energy control system 100 with electrical system 1800 includes connecting backup PV system 1860 to backup PV interconnection 160. In some embodiments, the method for integrating energy control system 100 with electrical system 1800 includes locating site CT 132 within the housing of energy control system 100 if all the electrical loads 1870 are connected to energy control system 100. In some embodiments, the method for integrating energy control system 100 with electrical system 1800 includes locating site CT 132 upstream of energy control system 100 and outside the housing of energy control system 100 if one or more electrical loads 1870 remain connected to main service panel 1802.

In some embodiments, due to the expansion of storage capacity (i.e., 26 kW) in electrical system 1800, energy control system 100 can run in backup mode for longer periods of time compared to electrical systems (e.g., electrical systems 400-1600) having less storage capacity. In some embodiments, PV monitoring system 130 can be configured to monitor the power output generated by backup PV system 1860 separately from the power output transmitted by energy storage system 1850.

Figure 19:
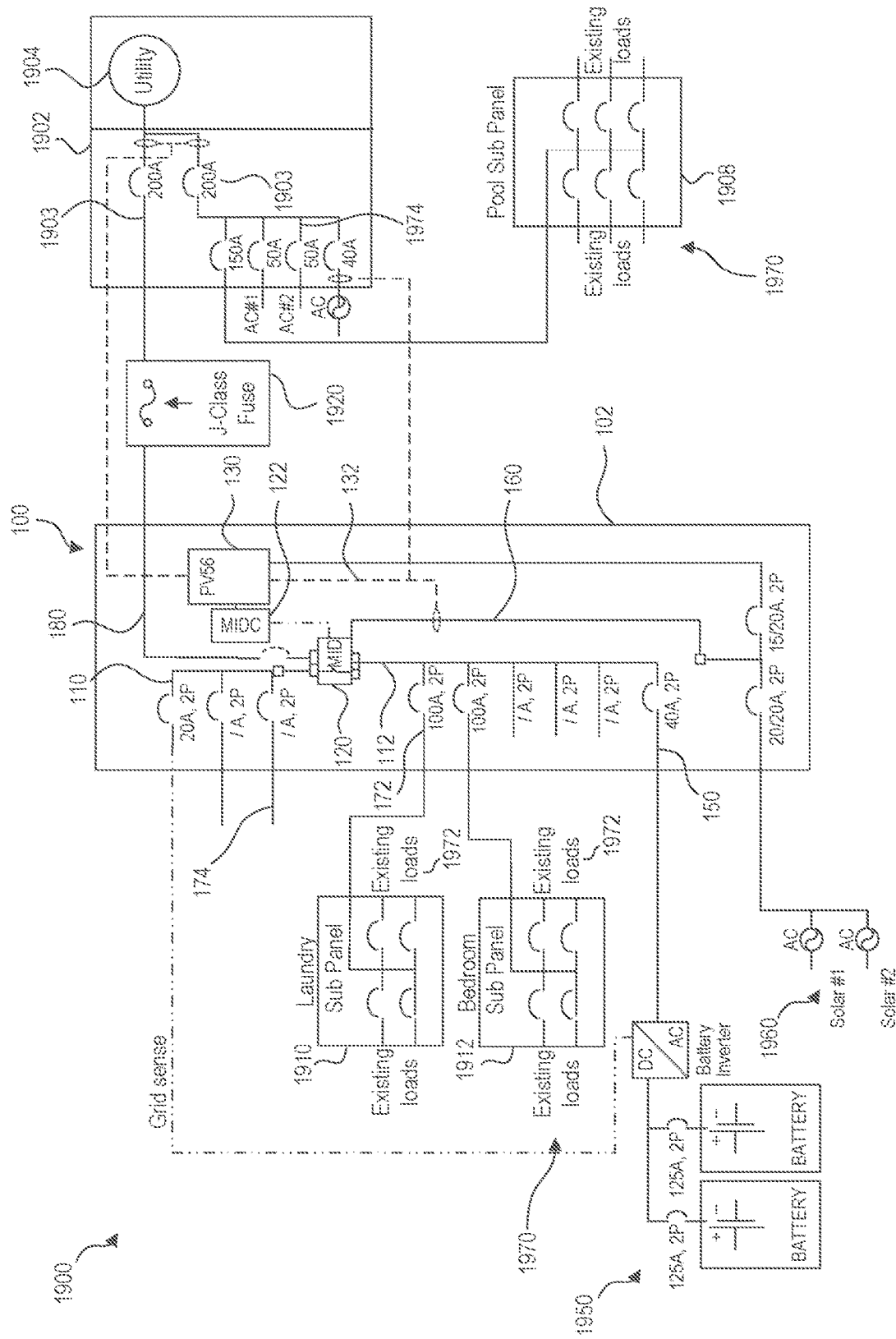
FIG. 19 illustrates an electrical system according to an embodiment.

FIG. 19 shows an electrical system 1900, in which energy control system 100 uses a J-Class Fuse to protect against a 22 kAiC potential fault (e.g., a short circuit event). As shown in FIG. 19, in some embodiments, electrical system 1900 can include a meter panel 1902 having a utility meter 1904. In some embodiments, meter panel 1902 can be supplied 400 A (i.e., a utility service size) from utility grid, in which the supply is split into two 200 A feeders 1903A, 1903B. In some embodiments, electrical system 1900 can include an upstream subpanel 1908 electrically coupled to one of the feeders 1903A. In some embodiments, upstream subpanel 1908 can be electrically coupled to a plurality of electrical loads 1970. In some embodiments, electrical system 1900 can include a first downstream subpanel 1910 connected to the plurality of electrical loads 1970 and a second downstream subpanel 1912 connected to the plurality of electrical loads 1970. In some embodiments, the plurality of electrical loads 1970 can include small electrical loads 1972 having a breaker size of 40 A or less (e.g., lighting, router, television) and large electrical loads 1974 having a breaker size greater than 40 A (e.g., air conditioner system, oven). In some embodiments, electrical system 1900 can include an energy storage system 1950 that includes any one of the features of other energy storage systems (e.g., storage system 250) described herein. In some embodiments, electrical system 1900 can include a backup PV system 1960 that includes any one of the features of other backup PV systems (e.g., backup PV system 260) described herein.

In some embodiments, a method (e.g., method 300) for integrating energy control system 100 with electrical system 1900 includes setting the energy control system 100 in a partial home backup configuration. In some embodiments, the method for integrating energy control system 100 with electrical system 1900 includes locating energy control system 100 downstream from meter panel 1902 and subpanel 1908 and upstream of first downstream subpanel 1910 and second downstream subpanel 1912. In some embodiments, the method for integrating energy control system 100 with electrical system 1900 includes connecting the other one of the 200 A feeders 1903B to energy control system 100 via grid interconnection 180. In some embodiments, the method for integrating energy control system 100 with electrical system 1400 includes locating site CT 132 at meter panel 1902.

In some embodiments, the method for integrating energy control system 100 with electrical system 1900 can include connecting subpanel 1910 to backup power bus 112 via backup load interconnection 172. In some embodiments, the method for integrating energy control system 100 with electrical system 1900 can include connecting energy storage system 1950 to backup power bus 112 via storage interconnection 150. In some embodiments, the method for integrating energy control system 100 with electrical system 1900 can include connecting backup PV system 1960 to backup PV interconnection 160.

In some embodiments, the method for integrating energy control system 100 with electrical system 1900 can include locating a J-class fuse 1920 upstream of microgrid interconnection device 120 and downstream of main service panel 1902 (e.g., along grid interconnection 180). By connecting J-class fuse 1920 to grid interconnection 180, energy control system can meet as a 22 kAiC service rating. In some embodiments, a 4-pole circuit breaker can be installed in backup power bus 112 so that power can be isolated to one of the downstream subpanels 1910, 1912.

Figure 20:
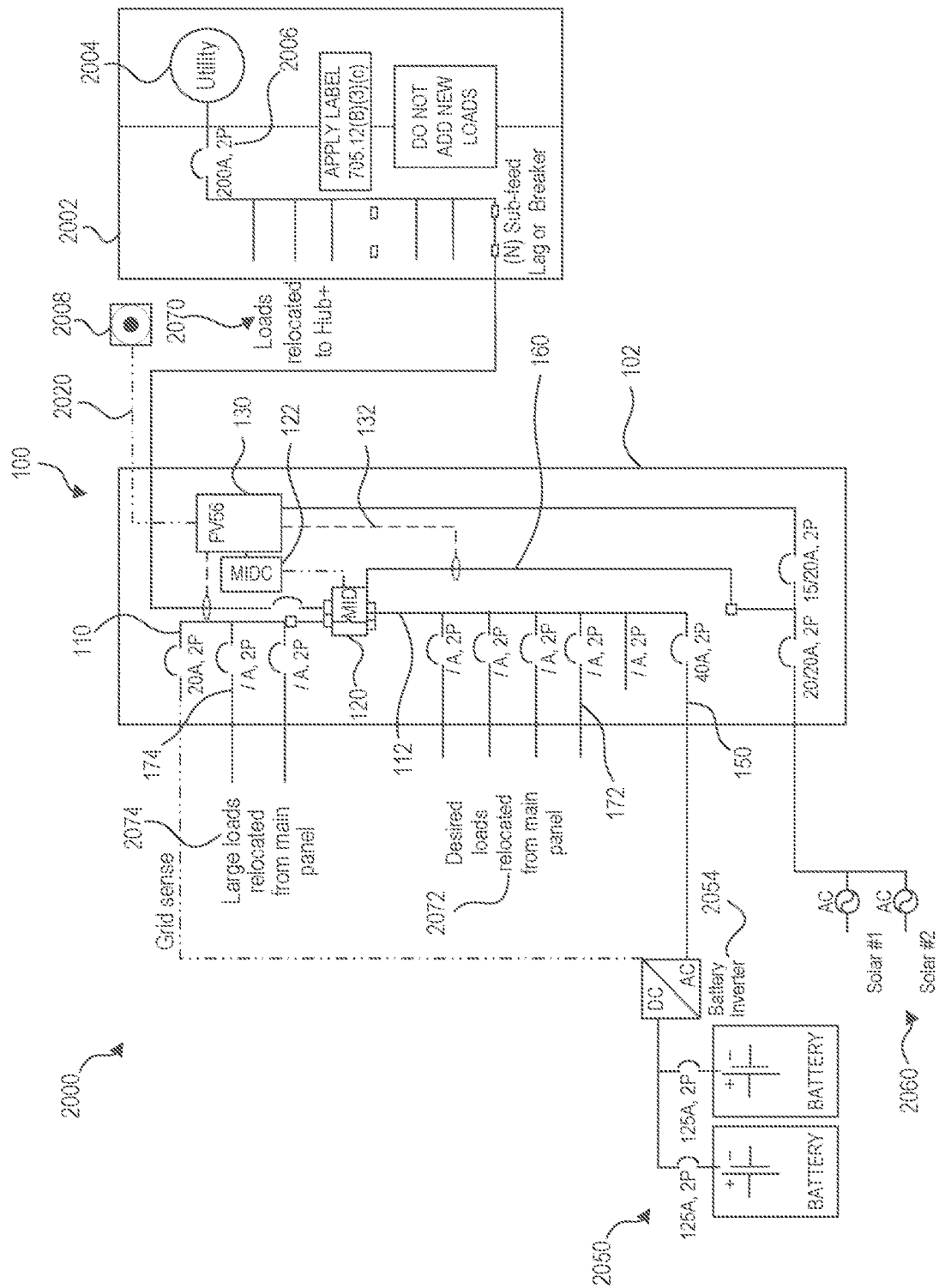
FIG. 20 illustrates an electrical system according to an embodiment.

FIG. 20 shows an electrical system 2000, in which energy control system 100 is integrated with a rapid shutdown switch to comply with safety standards (e.g., NEC 690.12 (C)). As shown in FIG. 20, in some embodiments, electrical system 2000 can include a main service panel 2002 integrated with a utility meter 2004. In some embodiments, main service panel 2002 can include a main circuit breaker 2006. In some embodiments, main service panel 2002 can be connected to a plurality of electrical loads 2070. In some embodiments, the plurality of electrical loads 2070 can include small electrical loads 2072 having a breaker size of 40 A or less (e.g., lighting, router, television) and large electrical loads 2074 having a breaker size greater than 40 A (e.g., air conditioner system, oven). In some embodiments, electrical system 2000 can include a rapid shutdown switch 2008 configured to disrupt electrical connection between main service panel 2002 and the plurality of electrical loads 2070 located downstream. In some embodiments, rapid shutdown switch 2008 is located adjacent to main service panel 2002.

In some embodiments, electrical system 2000 can include an energy storage system 2050 that includes any one of the features of other energy storage systems (e.g., storage system 250) described herein. In some embodiments, electrical system 2000 can include a backup PV system 2060 (e.g., 7.5 kW AC PV system with 2 strings of 12 solar panels) that includes any one of the features of other backup PV systems (e.g., backup PV system 260) described herein. In some embodiments, electrical system 2000 does not include any subpanels.

In some embodiments, a method (e.g., method 300) for integrating energy control system 100 with electrical system 2000 includes setting the energy control system 100 in a partial home backup configuration. In some embodiments, the method for integrating energy control system 100 with electrical system 2000 includes locating energy control system 100 downstream from main service panel 2002, where the main circuit breaker 2006 remains in the main service panel 2002, not within the housing of energy control system 100. In some embodiments, the method for integrating energy control system 100 with electrical system 2000 includes connecting energy control system 100 to rapid shutdown switch 2008 via an interconnection 2020 (e.g., 18 AWG Class 1 circuit). In some embodiments, when actuated, rapid shutdown switch 2008 is configured to transmit a signal to microgrid interconnection device 120 to open a service disconnect from main service panel 2002 to isolate the utility grid from all components disposed downstream of energy control system 100. In some embodiments, when actuated, rapid shutdown switch 2008 is configured to transmit a signal to microgrid interconnection device 120 to shutoff storage inverter 2054 of energy storage system 2050 and backup PV interconnection 160 such that output from energy storage system 2050 and backup PV system 2060 are turned off.

In some embodiments, the method for integrating energy control system 100 with electrical system 2000 includes removing the plurality of electrical loads 2070 from the main service panel 2002 and connecting the electrical loads 2070 to energy control system 100. In some embodiments, small electrical loads 2072 can be connected to the backup power bus 112 via one or more backup load interconnections 172. In some embodiments, large electrical loads 2074 can be connected to the non-backup power bus 110 via non-backup load interconnections 174. In some embodiments, the method for integrating energy control system 100 with electrical system 2000 includes connecting energy storage system 2050 to backup power bus 112 via storage interconnection 150. In some embodiments, the method for integrating energy control system 100 with electrical system 2000 includes connecting backup PV system 2060 to backup PV interconnection 160. In some embodiments, the method for integrating energy control system 100 with electrical system 2000 includes locating site CT 132 within the housing of energy control system 100 if all of the electrical loads 2070 are connected to energy control system 100. In some embodiments, the method for integrating energy control system 100 with electrical system 1000 includes locating site CT 132 upstream of energy control system 100 and outside the housing of energy control system 100 if one or more electrical loads 2070 remain connected to main service panel 2002.

Figure 21:
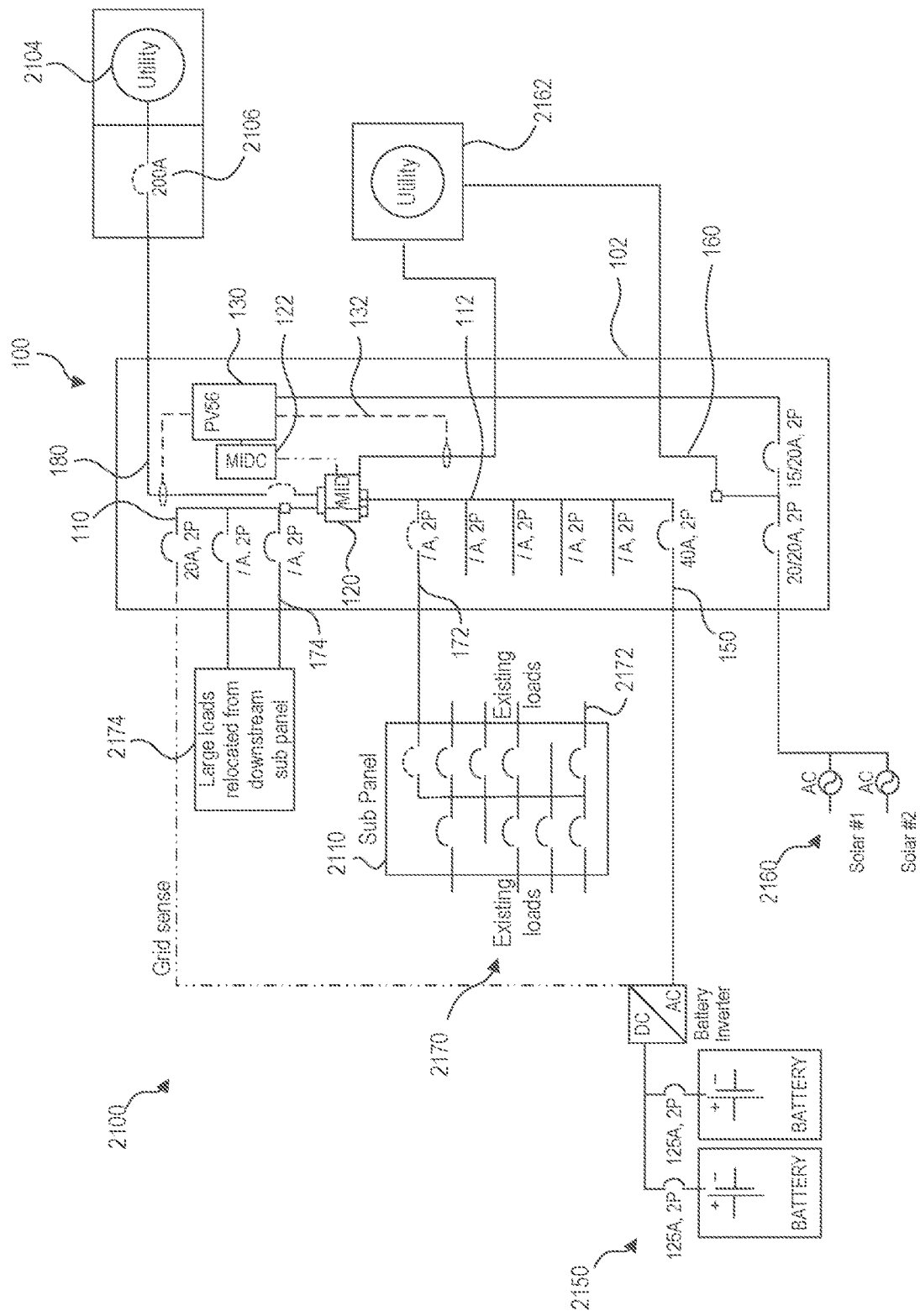
FIG. 21 illustrates an electrical system according to an embodiment.

FIG. 21 shows an electrical system 2100, in which a PV production meter (e.g., PV production meter 2162) is connected to backup PV interconnection 160. As shown in FIG. 21, in some embodiments, electrical system 2100 can include a utility meter 2104. In some embodiments, electrical system 2100 can include a main circuit breaker 2106. In some embodiments, electrical system 2100 can include a downstream subpanel 2110 connected directly to a plurality of electrical loads 2170. In some embodiments, the plurality of electrical loads 2170 can include small electrical loads 2172 having a breaker size of 40 A or less (e.g., lighting, router, television) and large electrical loads 2174 having a breaker size greater than 40 A (e.g., air conditioner system, oven). In some embodiments, electrical system 2100 can include an energy storage system 2150 that includes the features of other energy storage systems (e.g., storage system 250) described herein. In some embodiments, electrical system 2100 can include a backup PV system 2160 that includes the features of other backup PV systems (e.g., backup PV system 260) described herein. In some embodiments, electrical system 2100 can include a PV production meter 2162 configured to monitor power output of backup PV system 2160.

In some embodiments, a method (e.g., method 300) for integrating energy control system 100 with electrical system 2100 includes setting the energy control system 100 in a partial home backup configuration. In some embodiments, the method for integrating energy control system 100 with electrical system 2100 includes locating energy control system 100 downstream from meter panel 2102 and upstream from subpanel 2110. In some embodiments, the main circuit breaker 2106 remains in the meter panel 2102, not within the housing of energy control system 100. In some embodiments, the method for integrating energy control system 100 with electrical system 2100 includes connecting subpanel 2110 to backup power bus 112 via backup load interconnection 172. In some embodiments, the method for integrating energy control system 100 includes removing large electrical loads 2174 from subpanel 2110 and connecting large electrical loads 2174 to the non-backup power bus 110 via non-backup load interconnections 174. In some embodiments, the method for integrating energy control system 100 with electrical system 2100 includes connecting energy storage system 2150 to backup power bus 112 via storage interconnection 150. In some embodiments, the method for integrating energy control system 100 with electrical system 2100 includes connecting backup PV system 2160 to backup PV interconnection 160. In some embodiments, the method for integrating energy control system 100 with electrical system 2100 includes routing backup PV interconnection 160 to PV production meter 2162.

In some embodiments, the method for integrating energy control system 100 with electrical system 2100 includes locating site CT 132 within the housing of energy control system 100 if all of the electrical loads 2170 are connected to energy control system 100. In some embodiments, the method for integrating energy control system 100 with electrical system 2100 includes locating site CT 132 upstream of energy control system 100 and outside the housing of energy control system 100 if one or more electrical loads 2170 are not connected to energy control system 100.

Figure 22A:
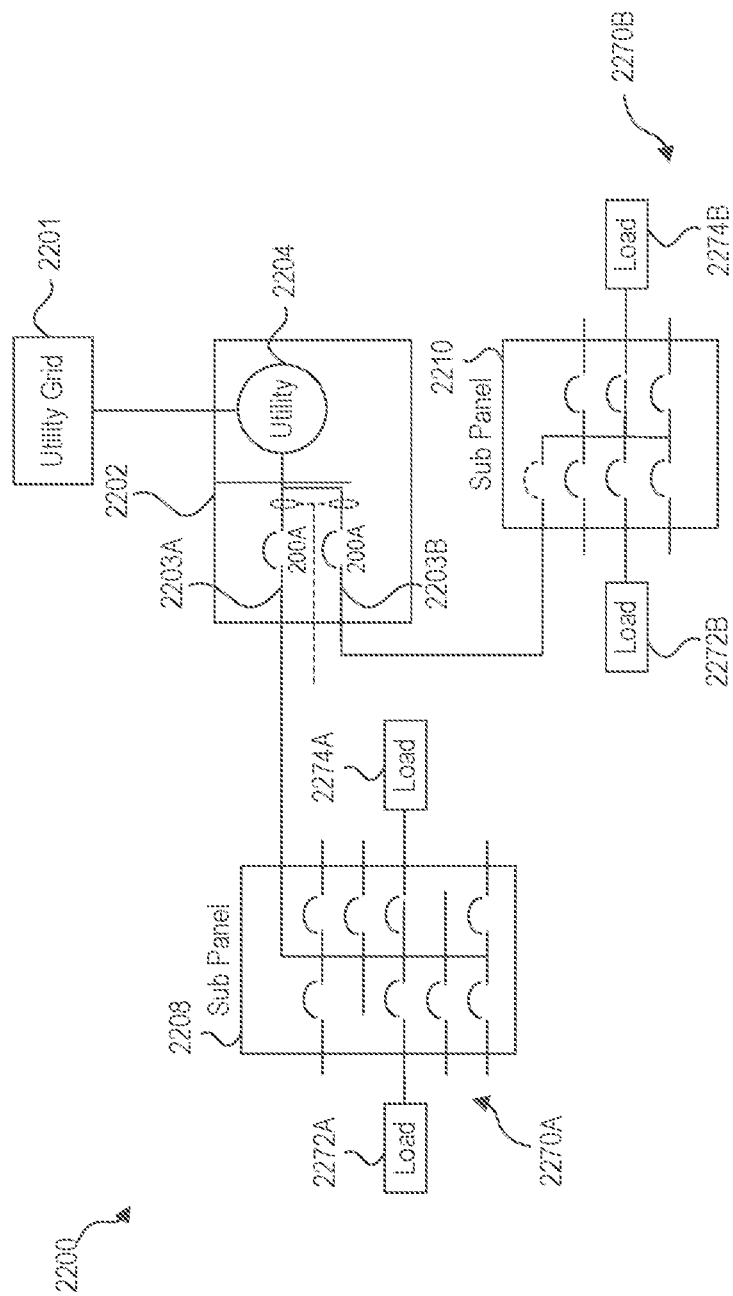
FIG. 22A illustrates an electrical system according to an embodiment

FIG. 22A shows an electrical system 2200 having a utility service size larger than a 200 A service panel, such as for example, a 400 A service split into two 200 A feeders. As shown in FIG. 22A, electrical system 2200 can include a service panel 2202 having a utility meter 2204. Service panel 2202 can be supplied 400 A current (i.e., a utility service size) from a utility grid 2201, in which the power supply is split into two 200 A rated feeders 2203A, 2203B. Electrical system 2200 can include a first subpanel 2208 electrically coupled to a first feeder 2203A and electrically coupled to a plurality of first electrical loads 2270A, where first subpanel 2208 is disposed downstream of first feeder 2203A and upstream of the plurality of first electrical loads 2270A. Electrical system 2200 can include a second subpanel 2210 electrically coupled to a second feeder 2203B and electrically coupled to a plurality of second electrical loads 2270B, where second subpanel 2210 is disposed downstream of second feeder 2203B and upstream of the plurality of second electrical loads 2270B. The plurality of first and second electrical loads 2270A, 2270B can include small electrical loads 2272A, 2272B having a breaker size of 40 A or less (e.g., lighting, router, television) and large electrical loads 2274A, 2274B having a breaker size greater than 40 A (e.g., air conditioner system, oven).

In some embodiments, electrical systems can implement multiple energy control systems to enable backup power supply for each feeder of larger service panels (e.g., service panel 2202). For example, in some embodiments, microgrid interconnection device 120 can have a 200 A rating, which can limit energy control system 100 from serving multiple feeders 2203A, 2203B of service panel 2202. Accordingly, in some embodiments, multiple energy control systems 100A, 100B can be provided with electrical system 2200, as shown for example in FIG. 22B. In some embodiments, electrical system 2200 can include a first energy control system 100A electrically coupled to first feeder 2203A of service panel 2202 via grid interconnection 180A. In some embodiments, electrical system 2200 can include a second energy control system 100B electrically coupled to second feeder 2203B of service panel 2202 via grid interconnection 180B. In some embodiments, first energy control system 100A is electrically coupled to first subpanel 2208 via backup load interconnection 172A. In some embodiments, second energy control system 100B is electrically coupled to second subpanel 2210 via backup load interconnection 172B.

In some embodiments, electrical system 2200 includes a first energy storage system 2250A electrically coupled to first energy control system 100A and a second energy storage system 2250B electrically coupled to second energy control system 100B. First and second energy storage systems 2250A, 2250B can include the features of other energy storage systems (e.g., storage system 250) described herein. In some embodiments, electrical system 2200 includes a first backup PV system 2260A electrically coupled to first energy control system 100A and a second backup PV system 2260B electrically coupled to second energy control system 100B. First and second backup PV systems 2260A, 2260B can include the features of other backup PV systems (e.g., backup PV system 260) described herein. In some embodiments, first energy control system 100A, first backup PV system 2260A, first energy storage system 2250A, and first electrical loads 2270A are collectively configured as a first microgrid system 2220, and second energy control system 100B, second backup PV system 2260B, second energy storage system 2250B, and second electrical loads 2270B are collectively configured as a second microgrid system 2230 that operates independent of first microgrid system 2220.

In some embodiments, a method for integrating first and second energy control systems 100A, 100B with electrical system 2200 includes setting the energy control systems 100A, 100B in a partial home backup configuration. In some embodiments, the method includes locating first energy control system 100A downstream of service panel 2202 and upstream of first subpanel 2208. In some embodiments, the method includes locating second energy control system 100B downstream of service panel 2202 and upstream of second subpanel 2210. In some embodiments, the method includes connecting first feeder 2203A of service panel 2202 to grid interconnection 180A of first energy control system 100A and connecting second feeder 2203B of service panel 2202 to grid interconnection 180B of second energy control system 100B. In some embodiments, the method includes connecting first subpanel 2208 to backup power bus 112A via backup interconnection 115A of first energy control system 100A and connecting second subpanel 2210 to backup power bus 112B via backup interconnection 115B of second energy control system 100B.

In some embodiments, the method includes removing first large electrical loads 2274A from first subpanel 2208 and connecting first large electrical loads 2274A to non-backup power bus 110A via non-backup load interconnection 174A of first energy control system 100A. In some embodiments, the method includes removing second large electrical loads 2274B from second subpanel 2210 and connecting second large electrical loads 2274B to non-backup power bus 110B via non-backup load interconnection 174B of second energy control system 100B. In some embodiments, the method includes connecting first energy storage system 2250A to backup power bus 112A via storage interconnection 150A of first energy control system 100A. In some embodiments, the method includes connecting second energy storage system 2250B to backup power bus 112B via storage interconnection 150B of second energy control system 100B. In some embodiments, the method includes connecting first backup PV system 2260A to backup PV interconnection 160A of first energy control system 100A. In some embodiments, the method includes connecting second backup PV system 2260B to backup PV interconnection 160B of second energy control system 100B.

Figure 23:
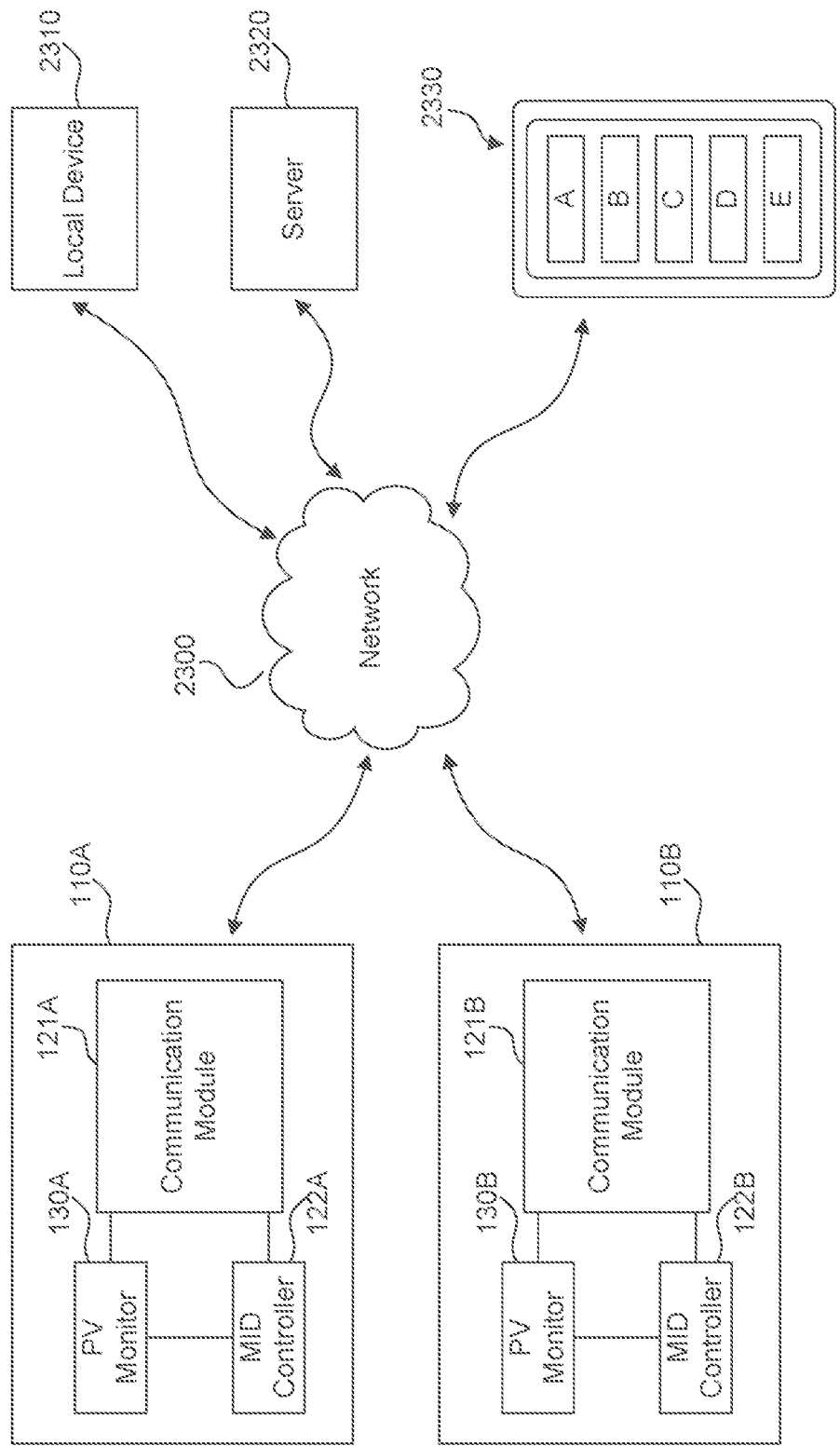
FIG. 23 illustrates a network according to an embodiment.

In some embodiments, as shown in FIG. 23 for example, first energy control system 100A and second energy control system 100B can be configured to communicate over a network 2300 with one or more computing device, for example, a local computing device 2310 (e.g., desktop computer, laptop computer, etc.), a server 2320, and/or a user device 2330 (e.g., cell phone, smartphone, tablet computer, laptop computer, desktop computer, personal computer, wearable computer, smartwatch, or other computing device) to collect electronic data from each of the energy control systems 100A, 100B. For example, controller 122A, 122B and/or PV monitoring system 130 of energy control systems 100A, 100B can include a communication module 121A, 121B (e.g., transceiver, filter, processor) for transmitting electronic data (e.g., time series data, load consumption, battery state of charge, PV power output, power usage information, etc.) over network 2300. In some embodiments, network 2300 can include a Wireless Local Area Network ("WLAN"), Controller Area Network ("CAN"), Metropolitan Area Network ("MAN"), Wide Area Network ("WAN"), and/or cellular network. In some embodiments, communication module of controller 122A, 122B and/or PV monitoring system 130 can be compatible with specific network standards such as, for example, wireless fidelity (Wi-Fi under IEEE 802.11), Bluetooth (under IEEE 802.15.1), Zigbee (under IEEE 802.15.4), a power line communication (PLC), and/or a broadband cellular network (2G, 3G, 4G, and/or 5G networks). In some embodiments, controller 122A, 122B and/or PV monitoring system 130A, 130B can connect to network 2300 using a wired connection (e.g., Ethernet, RS-232 cable, RS-485 cable, and/or the like).

Figure 25:
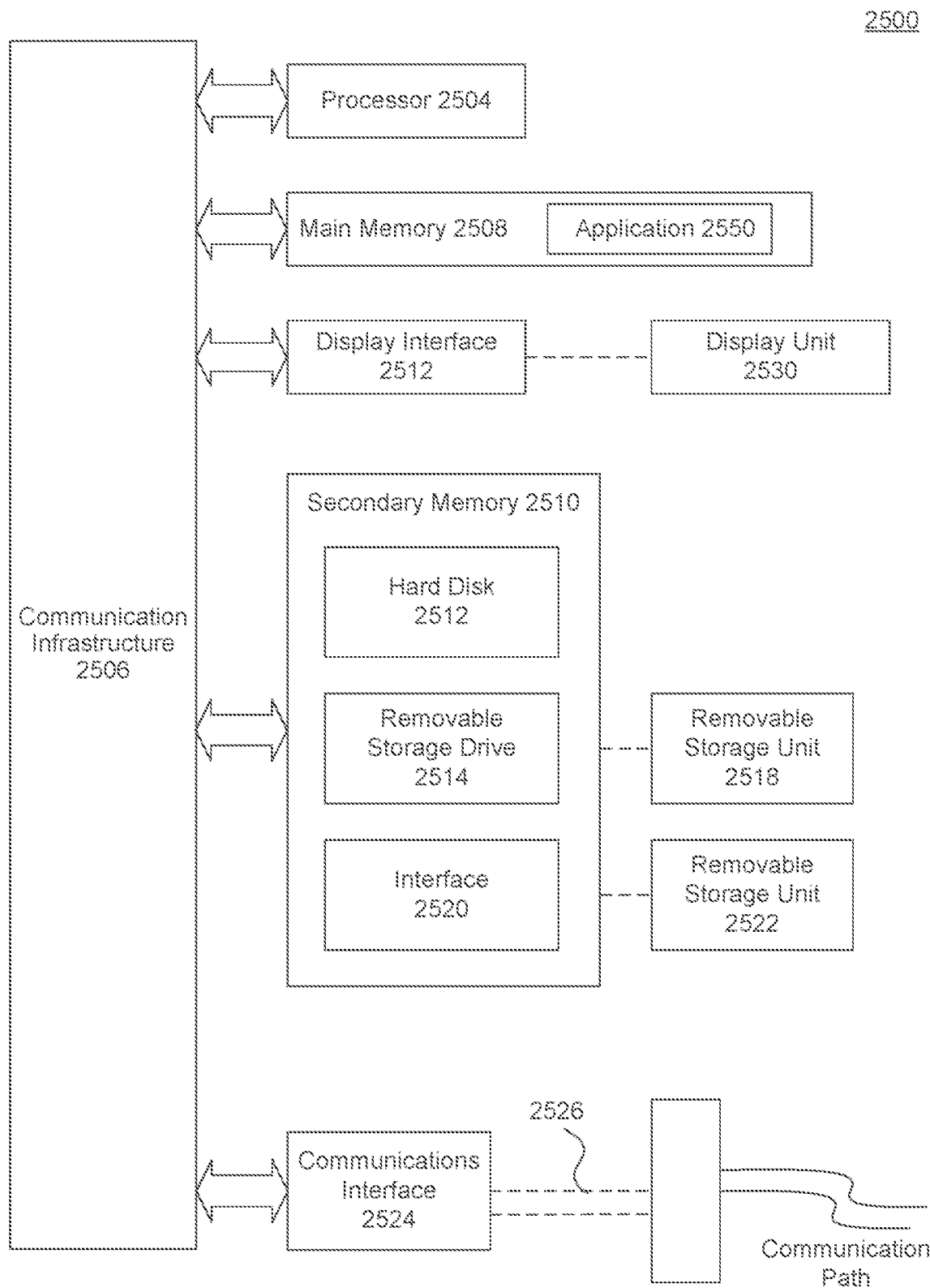
FIG. 25 illustrates a block diagram showing aspects of a computer system according to an embodiment.

FIG. 25 illustrates an example computer system 2500 that can be implemented in local computing device 2310, server 2320, and/or user device 2330. In some embodiments, computer system 2500 can include a processor device 2504. Processor device 2504 can be a special purpose or a general purpose processor device. As will be appreciated by persons skilled in the relevant art, processor device 2504 can also be a single processor in a multi-core/multiprocessor system, such system operating alone, or in a cluster of computing devices operating in a cluster or server farm. Processor device 2504 can be connected to a communication infrastructure 2506, for example, a bus, message queue, network, or multi-core message-passing scheme.

In some embodiments, computer system 2500 can include a main memory 2508, for example, random access memory (RAM), and can also include a secondary memory 2510.

Secondary memory 2510 can include, for example, a hard disk drive 2512, and/or removable storage drive 2514. Removable storage drive 2514 can include a floppy disk drive, a magnetic tape drive, an optical disk drive, a flash memory, a Universal Serial Bus (USB) drive, or the like. The removable storage drive 2514 reads from and/or writes to a removable storage unit 2518 in a well-known manner. Removable storage unit 2518 can include a floppy disk, magnetic tape, optical disk, etc. which is read by and written to by removable storage drive 2514. As will be appreciated by persons skilled in the relevant art, removable storage unit 2518 includes a computer usable storage medium having stored therein computer software instructions and/or data.

In some embodiments, computer system 2500 can include a display interface 2502 (which can include input and output devices such as keyboards, mice, etc.) that forwards graphics, text, and other data from communication infrastructure 2506 (or from a frame buffer not shown) for display on display unit 2530.

In some embodiments, secondary memory 2510 can include other similar means for allowing computer programs or other instructions to be loaded into computer system 2500. Such means can include, for example, a removable storage unit 2522 and an interface 2520. Examples of such means can include a program cartridge and cartridge interface (such as that found in video game devices), a removable memory chip (such as an EPROM, or PROM) and associated socket, and other removable storage units 2522 and interfaces 2520 which allow software and data to be transferred from the removable storage unit 2522 to computer system 2500.

Computer system 2500 can also include a communication interface 2524. Communication interface 2524 allows software and data to be transferred over network 2300 between computer system 2500 and external devices. Communication interface 2524 can include a modem, a network interface (such as an Ethernet card), a communication port, a PCMCIA slot and card, or the like. Software and data transferred via communication interface 2524 can be in the form of signals, which can be electronic, electromagnetic, optical, or other signals capable of being received by communication interface 2524. These signals can be provided to communication interface 2524 via a communication path 2526. Communication path 2526 carries signals and can be implemented using wire or cable, fiber optics, a phone line, a cellular phone link, an RF link or other communication channels.

In the context of the present disclosure, the terms "computer program medium" and "computer usable medium" are used to generally refer to media such as removable storage unit 2518, removable storage unit 2522, and a hard disk installed in hard disk drive 2512. Computer program medium and computer usable medium can also refer to memories, such as main memory 2508 and secondary memory 2510, which can be memory semiconductors (e.g., DRAMs, etc.).

Computer programs (also called computer control logic) are stored in main memory 2508 and/or secondary memory 2510. Computer programs can also be received via communication interface 2524. Such computer programs, when executed, enable computer system 2500 to implement the embodiments as discussed herein. In particular, the computer programs, when executed, enable processor device 2504 to implement the processes of the embodiments discussed here. Accordingly, such computer programs represent controllers of the computer system 2500. Where the embodiments are implemented using software, the software can be stored in a computer program product and loaded into computer system 2500 using removable storage drive 2514, interface 2520, and hard disk drive 2512, or communication interface 2524.

Embodiments of the present disclosure also can be directed to computer program products comprising software stored on any computer useable medium. Such software, when executed in one or more data processing device, causes a data processing device(s) to operate as described herein. Embodiments of the present disclosure can employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

In some embodiments, as shown in FIG. 25, for example, a desktop, mobile, and/or web application 2550 can reside in the form of computer readable instructions stored in the memory (e.g., main memory 2508) of local computing device 2310, server 2320, and/or user device 2330 for monitoring and tracking electronic data from the first and second energy control systems 100A, 100B. In some embodiments, application 2550 allows local computing device 2310, server 2320, and/or user device 2330 to aggregate the electronic data received from the first and second energy control systems 100A, 100B so that a user can monitor the state of the entire electrical system 2200. In some embodiments, application 2550 can allow the local computing device 2310, server 2320, and/or user device 2330 to display a graphical user interface shown on a display (e.g., display unit 2530). In some embodiments, the graphical user interface generated by executing application 2550 can include displaying graphical control elements, such as, for example, a table, a chart, and/or a graph of electronic data, for a user to review and/or manipulate to control microgrid systems (e.g., first and second microgrid systems 2220, 2230) of electrical system 2200. In some embodiments, the electronic data displayed by the graphical user interface of application 2550 can include historical data for each microgrid system, such as the amount of power consumed by electrical loads and the times at which the power was consumed, the average power output by the backup or non-backup PV system over a selected duration of time, and the average charging and/or discharging rate of the energy storage system. In some embodiments, the electronic data displayed by the graphical user interface of application 2550 can include current (e.g., real-time) data, such as the current load demand by the electrical loads, the available storage capacity of the energy storage system, and the current power output by backup and/or non-backup PV power generation system. In some embodiments, the electronic data displayed by the graphical user interface of application 2550 can include a total load consumption of all the electrical loads, a total state of charge of all the energy storage systems, and/or a total power output of all the backup and/or non-backup PV power generation systems.

Figure 22B:
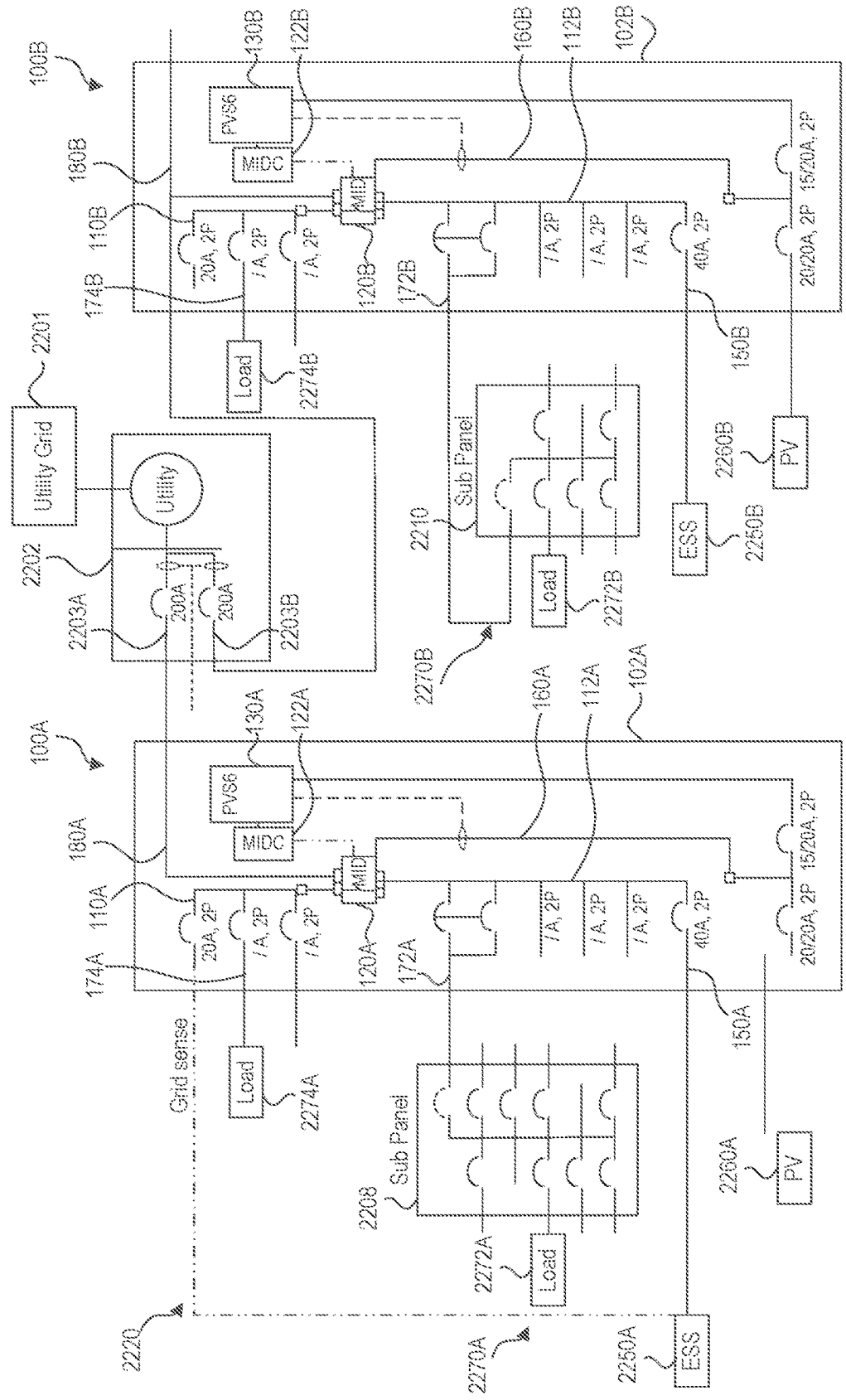
FIG. 22B illustrates an electrical system according to an embodiment.
Figure 24:
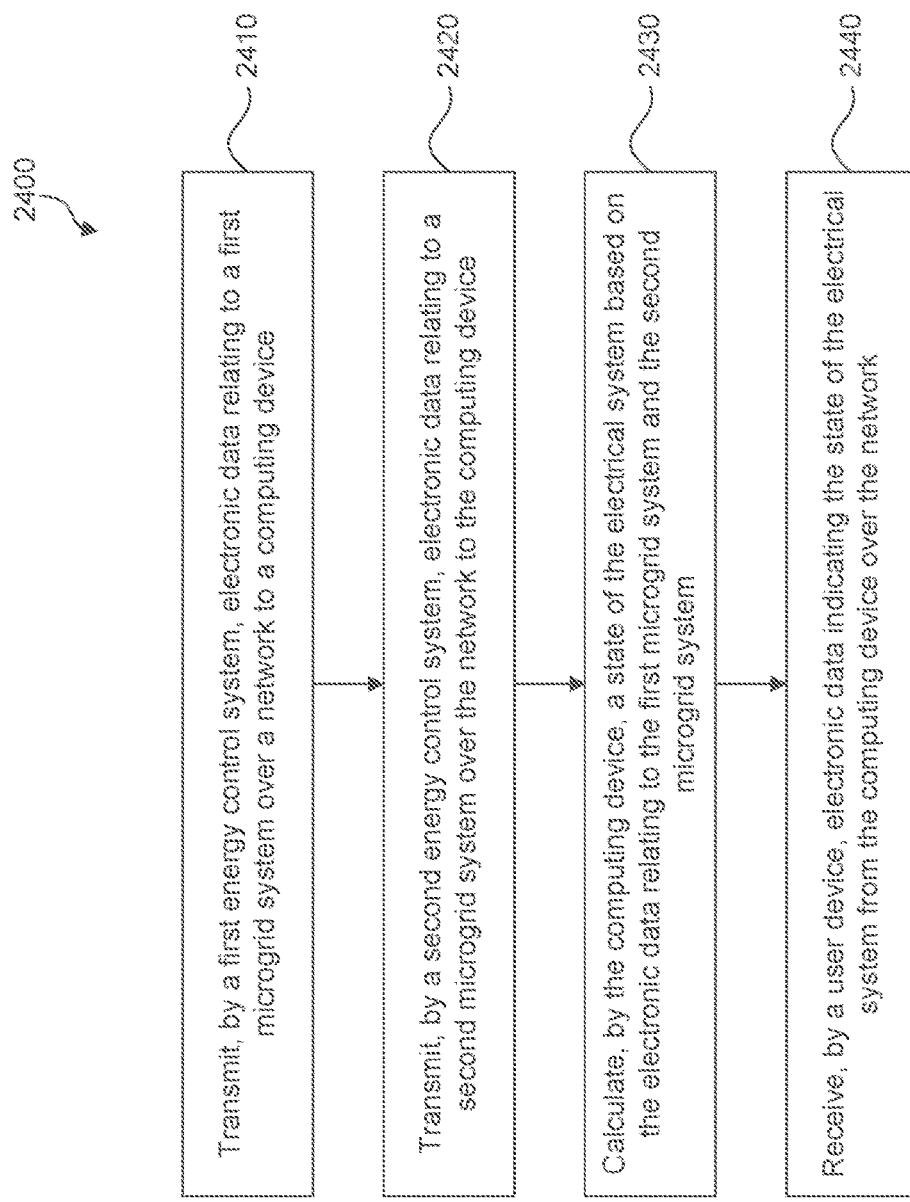
FIG. 24 illustrates a block diagram showing aspects of a method of monitoring an electrical system according to an embodiment.

FIG. 24 shows an example block diagram illustrating aspects of a method 2400 for monitoring a state of an electrical system, such as, for example, electrical system 2200 shown in FIG. 22B. One or more aspects of method 2400 can be implemented using hardware, software modules, firmware, tangible computer readable media having instructions stored thereon, or a combination thereof and can be implemented in one or more computer systems or other processing systems (e.g., computer system 2500).

In some embodiments, method 2400 can include a step 2410 of transmitting, by the first energy control system 100A, electronic data relating to first microgrid system 2220 over network 2300 to a computing device (e.g., local computing device 2310, server 2320, and/or user device 2330). In some embodiments, the electronic data relating to first microgrid system 2220 indicates a load consumption by the plurality of first electrical loads 2270A. In some embodiments, the electronic data relating to first microgrid system 2220 indicates a power output by first backup PV system 2260A. In some embodiments, the electronic data relating to first microgrid system 2220 indicates a current state of charge of the first energy storage system 2250A.

In some embodiments, method 2400 can include a step 2420 of transmitting, by the second energy control system 100B, electronic data relating to second microgrid system 2230 over network 2300 to the computing device (e.g., local computing device 2310, server 2320, and/or user device 2330). In some embodiments, the electronic data relating to second microgrid system 2230 indicates a load consumption by the plurality of second electrical loads 2270B. In some embodiments, the electronic data relating to second microgrid system 2230 indicates a power output by second backup PV system 2260B. In some embodiments, the electronic data relating to second microgrid system 2230 indicates a current state of charge of the second energy storage system 2250B.

In some embodiments, method 2400 can include a step 2430 of calculating, by the computing device (e.g., local computing device 2310, server 2320, and/or user device 2330), a state of electrical system 2200 based on the electronic data relating to first microgrid system 2220 and second microgrid system 2230. In some embodiments, the state of electrical system 2200 indicates a total load consumption based on the load consumption by the plurality of first electrical loads 2270A and second electrical loads 2270B. In some embodiments, the state of the electrical system indicates a total power output based on the power output of the first backup PV system 2260A and second backup PV system 2260B. In some embodiments, the state of the electrical system indicates a total state of charge based on the current state of charge of the first energy storage system 2250A and second energy storage system 2250B.

In some embodiments, method 2400 can include a step 2440 of receiving, by a user device (e.g., user device 2330 or a second user device), electronic data indicating the state of electrical system 2200 from the computing device (e.g., local computing device 2310, server 2320, and/or user device 2330) over network 2300. In some embodiments, step 2440 can include receiving the total load consumption by the plurality of first and second electrical loads 2270A, 2270B, the total power output by the first and second backup PV systems 2260A, 2260B, and/or total state of charge of the first and second energy storage systems 2250A, 2250B. In some embodiments, step 2440 can include displaying, by the user device (e.g., user device 2330 or a second user device), the state of electrical system 2200 and the electronic data relating to first and second microgrid systems 2220, 2230. Accordingly, a user can monitor the state of the electrical system 2200 via user device 2330 and/or any other suitable device.

Integrating multiple energy control systems 100A, 100B with an electrical system that features multiple 200 A feed circuits, such as, for example, electrical system 2200, provides significant advantages over electrical systems that include only a single energy control system. For example, integrating multiple energy control systems with an electrical system provides that backup power is distributed to all subpanels (e.g., subpanel 2208, subpanel 2210) of the electrical system, including subpanels that are electrically coupled to large electrical loads (e.g., 50 A rating or greater). Additionally, integrating multiple energy control systems 100A, 100B with an electrical system allows the electrical system to implement multiple microgrid systems (e.g., first and second microgrid systems 2220, 2230), in which each microgrid system can operate independent of the other microgrid system while still being synced with the grid. Furthermore, integrating multiple energy control systems 100A, 100B with an electrical system allows a user to expand the storage capacity and PV power output rating of the electrical system, thereby minimizing the use of grid power supply. Also, using a computing device to sync the electronic data from each of the microgrid systems prevents conflicts with managing site consumption, PV power output, and/or energy storage capacity of the entire electrical system.

It is to be appreciated that the Detailed Description section, and not the Summary and Abstract sections, is intended to be used to interpret the claims. The Summary and Abstract sections may set forth one or more but not all exemplary embodiments of the present embodiments as contemplated by the inventor(s), and thus, are not intended to limit the present embodiments and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A method for integrating an energy control system with an electrical system including a utility meter electrically coupled to a utility grid, a photovoltaic (PV) system, and a plurality of electrical loads, comprising:
    determining a site condition of the electrical system;
    determining a type of backup configuration for the electrical system based on the determined site condition;
    determining a location of at least one of a main circuit breaker, the PV system, a subpanel, and a site current transformer with respect to the energy control system based on the determined site condition and the determined type of backup configuration;
    locating the energy control system downstream of the utility meter and upstream of at least one of the plurality of electrical loads; and
    electrically coupling at least one of the main circuit breaker, the PV system, the subpanel, and the site current transformer to the energy control system based on the determined location,
wherein the site condition includes at least one of a type of service panel electrically coupled to the utility meter, a size of a utility service supplied by the utility grid, a size of a largest load breaker associated with the plurality of loads, and a storage capacity of the energy storage system.

2. The method of claim 1, wherein the energy control system includes a grid interconnection, a backup load interconnection, a non-backup load interconnection, and a backup power interconnection.

3. The method of claim 2, wherein the type of backup configuration includes a whole backup configuration and a partial backup configuration,
wherein under the whole backup configuration, all of the plurality of loads are connected to the backup load interconnection, and under the partial backup configuration, the plurality of loads include a plurality of backup loads connected to the backup load interconnection and a plurality of non-backup loads connected to the non-backup load interconnection.

4. A method for integrating an energy control system with an electrical system including a utility meter electrically coupled to a utility grid, a photovoltaic (PV) system, and a plurality of electrical loads, comprising:
determining a site condition of the electrical system;
determining a type of backup configuration for the electrical system based on the determined site condition;
determining a location of an electrical component with respect to the energy control system based on at least one of the determined site condition and the determined type of backup configuration; and
electrically coupling the electrical component to the energy control system based on the determined location.

5. The method of claim 4, wherein the electrical component includes at least one of a main circuit breaker, the PV system, a subpanel, and a site current transformer.

6. The method of claim 4, wherein the site condition includes at least one of a type of service panel electrically coupled to the utility meter, a size of a utility service supplied by the utility grid, a size of a largest load breaker associated with the plurality of loads, and a storage capacity of the energy storage system.

7. The method of claim 4, wherein the type of backup configuration includes a whole backup configuration and a partial backup configuration,
wherein under the whole backup configuration, all of the plurality of loads are electrically coupled to a backup load interconnection of the energy control system, and under the partial backup configuration, the plurality of loads include a plurality of backup loads electrically coupled to the backup load interconnection of the energy control system and a plurality of non-backup loads connected to a non-backup load interconnection of the energy control system.

8. The method of claim 4, wherein determining the location of the electrical component includes determining whether to locate the electrical component inside a housing of energy control system or outside the housing of energy control system.

9. The method of claim 8, wherein the electrical component includes at least one of a main circuit breaker and a site current transformer.

10. The method of claim 4, wherein determining the location of the electrical component includes determining whether to electrically couple the electrical component to a non-backup side of the energy control system or a backup side of the energy control system.

11. The method of claim 10, wherein the electrical component includes at least one of the PV system and a subpanel.

12. The method of claim 4, wherein the energy control system is located downstream of the utility meter and upstream of one or more of the plurality of loads.

13. The method of claim 4, wherein the plurality of electrical loads include a plurality of first backup loads and a plurality of second backup loads,
wherein the site condition includes a service panel electrically coupled to a utility grid, the service panel comprising a first feed circuit and a second feed circuit, and
wherein the electrical component includes:
a first subpanel electrically coupled to the first feed circuit and the plurality of first backup loads, and
a second subpanel electrically coupled to the second feed circuit and the plurality of second backup loads.

14. The method of claim 13, wherein the energy control system includes a first energy control system and a second energy control system, and
wherein determining the location of the electrical component with respect to the energy control system includes:
locating the first energy control system downstream of the service panel and upstream of the first subpanel, and
locating the second energy control system downstream of the service panel and upstream of the second subpanel.

15. The method of claim 14, wherein electrically coupling the electrical component to the energy control system includes:
electrically coupling the first subpanel to a backup load interconnection of the first energy control system, and
electrically coupling the second subpanel to a backup load interconnection of the second energy control system.

* * * * *